(12) United States Patent
Fukuta et al.

(10) Patent No.: US 11,171,880 B2
(45) Date of Patent: Nov. 9, 2021

(54) RESERVATION MANAGING METHOD, AND INFORMATION PROCESSING DEVICE, AND NON-TRANSITORY COMPUTER-READABLE STORAGE MEDIUM FOR STORING RESERVATION MANAGING PROGRAM

(71) Applicant: FUJITSU LIMITED, Kawasaki (JP)

(72) Inventors: Shigeki Fukuta, Setagaya (JP); Seiji Okura, Setagaya (JP); Kensuke Baba, Fukuoka (JP); Tomoya Noro, Yokohama (JP); Takao Mohri, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/817,687

(22) Filed: Mar. 13, 2020

(65) Prior Publication Data

US 2020/0296056 A1 Sep. 17, 2020

(30) Foreign Application Priority Data

Mar. 14, 2019 (JP) .............................. JP2019-047790

(51) Int. Cl.
*H04L 12/911* (2013.01)
*H04L 12/24* (2006.01)

(52) U.S. Cl.
CPC .......... *H04L 47/827* (2013.01); *H04L 41/069* (2013.01); *G06F 2212/1008* (2013.01)

(58) Field of Classification Search
CPC ... H04L 47/827; H04L 41/069; H04L 47/748; H04L 41/0896; G06F 2212/1008
See application file for complete search history.

(56) References Cited

U.S. PATENT DOCUMENTS

| 2003/0004772 | A1* | 1/2003 | Dutta | G06Q 10/025 718/100 |
| 2009/0164259 | A1* | 6/2009 | Mizrachi | G06Q 10/02 705/5 |
| 2014/0229575 | A1 | 8/2014 | Yamahara | |

FOREIGN PATENT DOCUMENTS

| JP | 2000-040112 A | 2/2000 |
| JP | 2013-080285 A | 5/2013 |
| WO | 2017/163379 A1 | 9/2017 |

OTHER PUBLICATIONS

Masayuki Ota et al., "You can be a Bot developer in 50 minutes! ~ Hands-on know-how and architecture with Azure and Office 365 ~", de: code 2017, Jun. 14, 2017 (Total 8 pages) [Online]Internet Search: Feb. 13, 2019 <https://channel9.msdn.com/Events/de-code/2017/TL08>.

* cited by examiner

*Primary Examiner* — Joe Chacko
(74) *Attorney, Agent, or Firm* — Fujitsu Patent Center

(57) ABSTRACT

A reservation managing method implemented by a computer, the reservation managing method includes: executing first processing in response to receiving of a condition for searching for a resource, the received condition being a condition specified from a user, the first processing including searching for a resource matching the received condition among a plurality of resources; storing information about transition of the condition for searching for a resource in a memory in association with the user based on a condition when a reservation by the user is not set among the received conditions; and outputting a notification that a reservation for one resource of the plurality of resources may be set to the user when a reservation for the one resource is canceled, and when the one resource matches the condition identified from the information stored in the memory in association with the user.

14 Claims, 30 Drawing Sheets

FIG. 6

| SEARCH ID | ORGANIZER | PARTICIPANTS | TITLE | RESERVATION CONDITION |
|---|---|---|---|---|
| 000101 | X | A,B | PROGRESS CONFERENCE | 1. TIME: 10:00 TO 11:00, 11:00 TO 12:00<br>2. PLACE: ROOM ON SIXTH FLOOR, ROOM ON FIFTH FLOOR<br>3. UNDESIRABLE CONDITION: CONFERENCE TABLE 1 ON SIXTH FLOOR, UNDESIRABLE CONDITION: CONFERENCE TABLE 2 |
| 000110 | | | | |
| 000125 | | | | |

Scheduling Assistant

User Input

| CONFERENCE TITLE | AI CONFERENCE ARRANGEMENT (TEST) | ~901 |
| NAMES OF PARTICIPANTS | BABA | ~902 |

PLACE CONDITION | MUSASHI NAKAHARA | KAWASAKI INSTITUTE | BUILDING NAME | ☐ ▶ FLOOR ~903
☐ PRIVATE ROOM ☐ DISPLAY ☐ Wifi ☐ WIRED LAN ☐ USABLE BY GUESTS DATE RANGE
● start: 12/27/2018  end: 12/27/2018 ~904
○ NEXT WEEK ▽

TIME RANGE
● start: 11:00  end: 12:00 ~905
○ ALL DAY (ALL) ▽

HOLDING TIME PERIOD  ◀ 1 ▶ ~906

[ SEARCH ] ~907

900

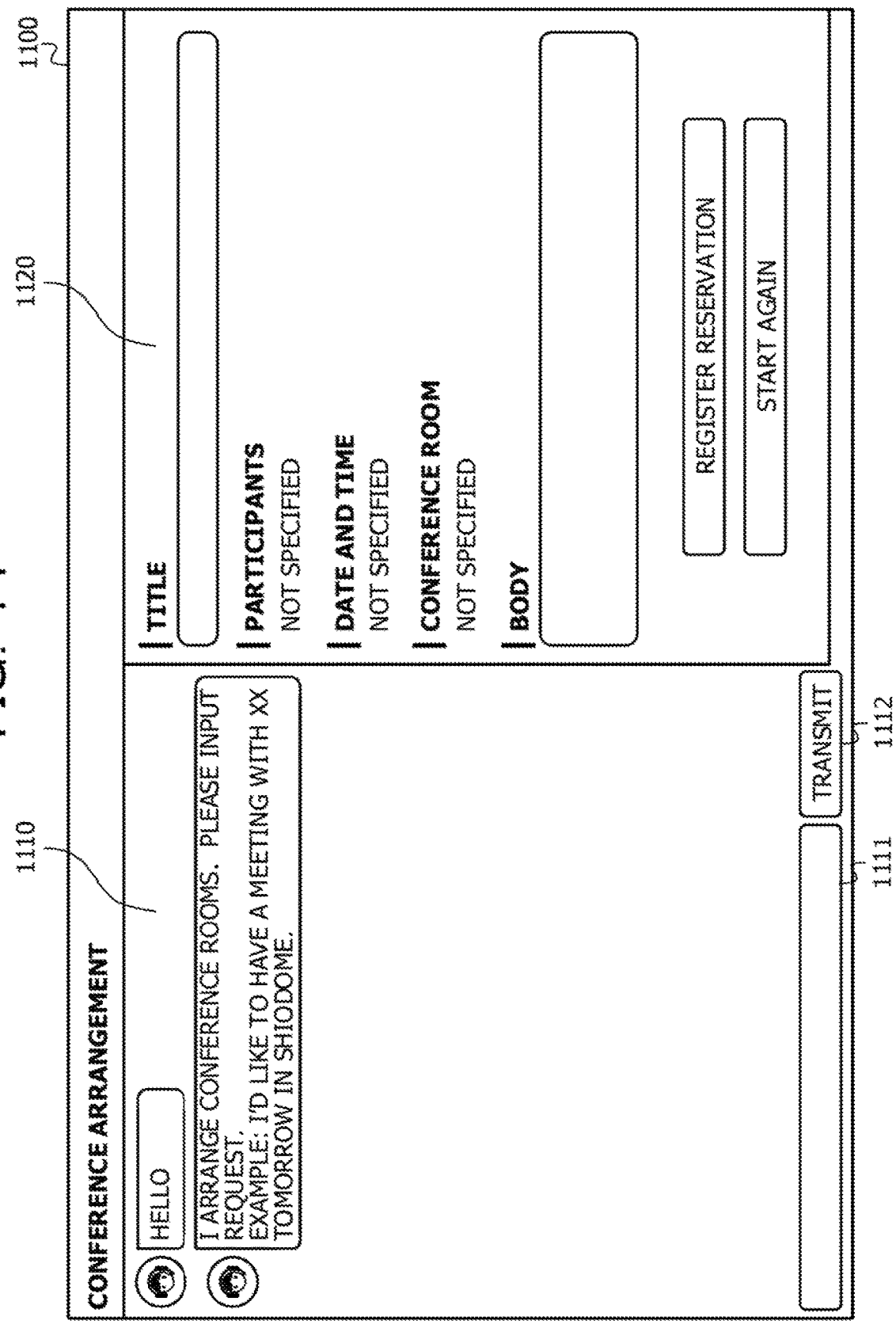

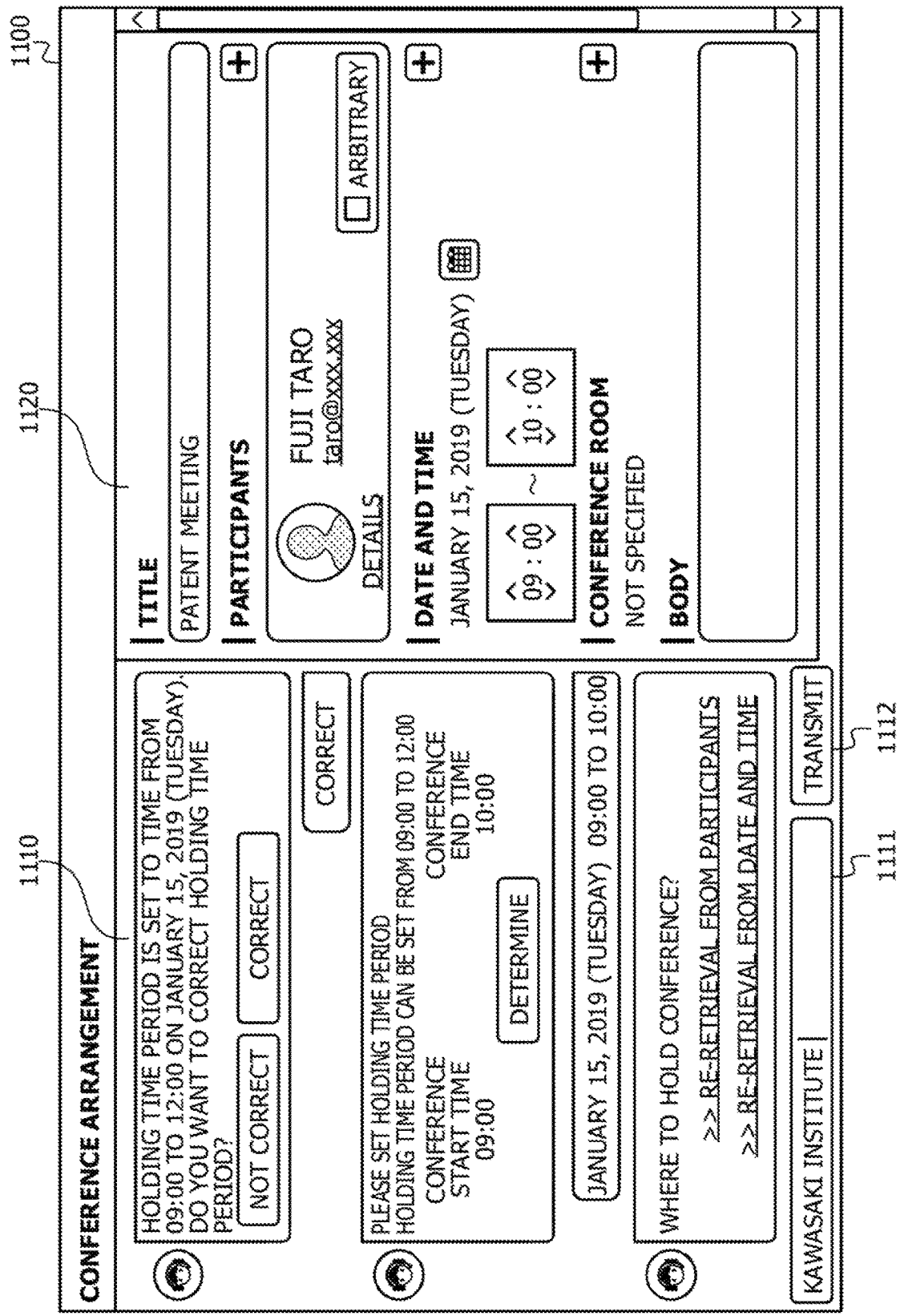

FIG. 13

CONFERENCE ARRANGEMENT — 1110

- SEARCHING FOR HOLDING TIME PERIOD...
- FOLLOWING CONFERENCE ROOMS ARE FOUND. PLEASE SELECT CANDIDATE CONFERENCE ROOM

KAWASAKI INSTITUTE

- KAWASAKI INSTITUTE, SIXTH FLOOR, CONFERENCE ROOM A, CONFERENCE TABLE, 6 PEOPLE
- KAWASAKI INSTITUTE, THIRD FLOOR, CONFERENCE ROOM B, CONFERENCE TABLE, 6 PEOPLE
- KAWASAKI INSTITUTE, THIRD FLOOR, CONFERENCE ROOM C, CONFERENCE TABLE, 44 PEOPLE

VIEW ALL CONFERENCE ROOMS ∨

[ CORRECT AND ADD ]  [ DETERMINE ]

1111

[ TRANSMIT ] — 1112

— 1100

— 1120

TITLE: PATENT MEETING

PARTICIPANTS: FUJI TARO  taro@xxx.xxx  DETAILS  ☐ ARBITRARY

ARBITRARY: JANUARY 15, 2019 (TUESDAY)  09:00 ~ 10:00

CONFERENCE ROOM: NOT SPECIFIED

BODY:

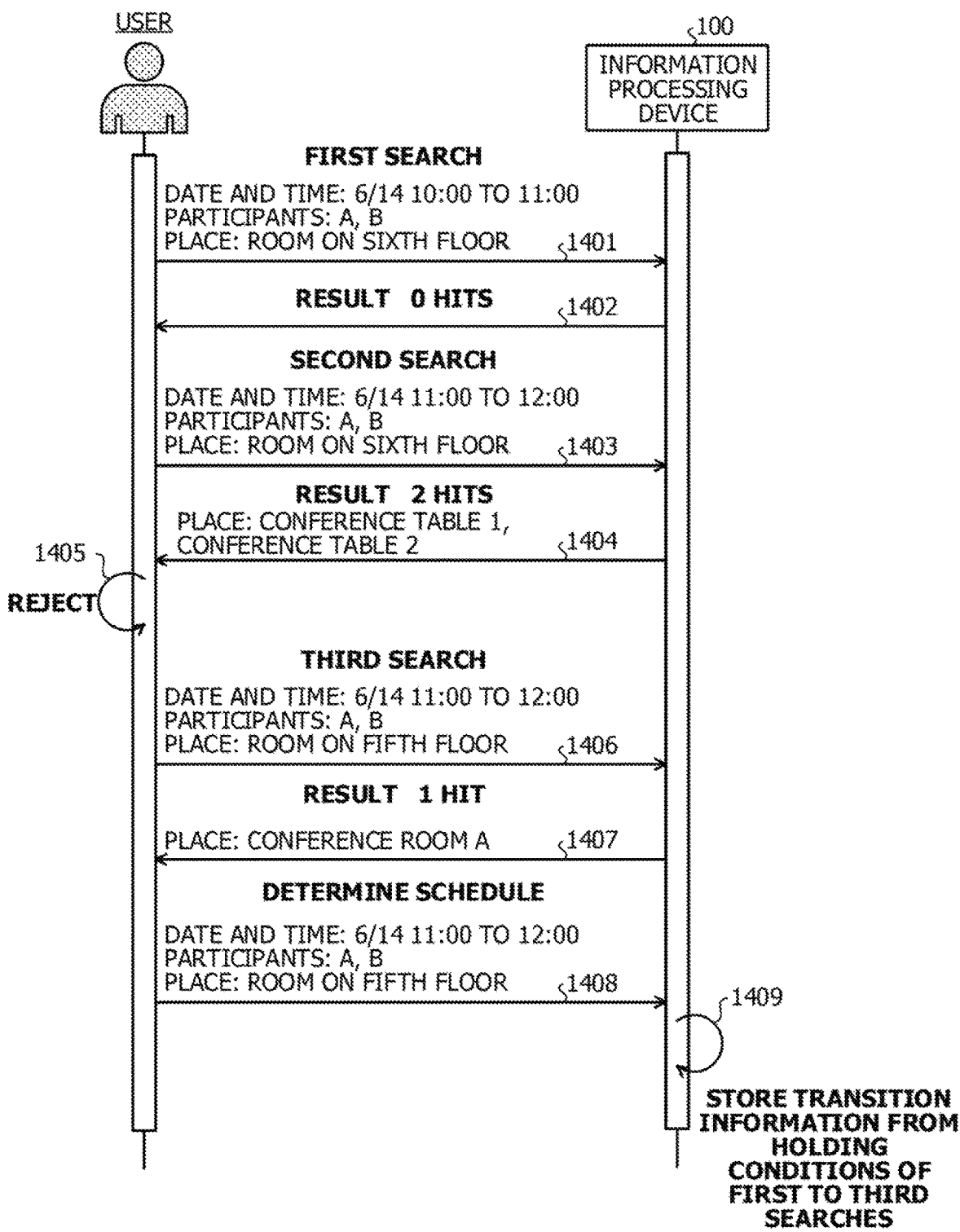

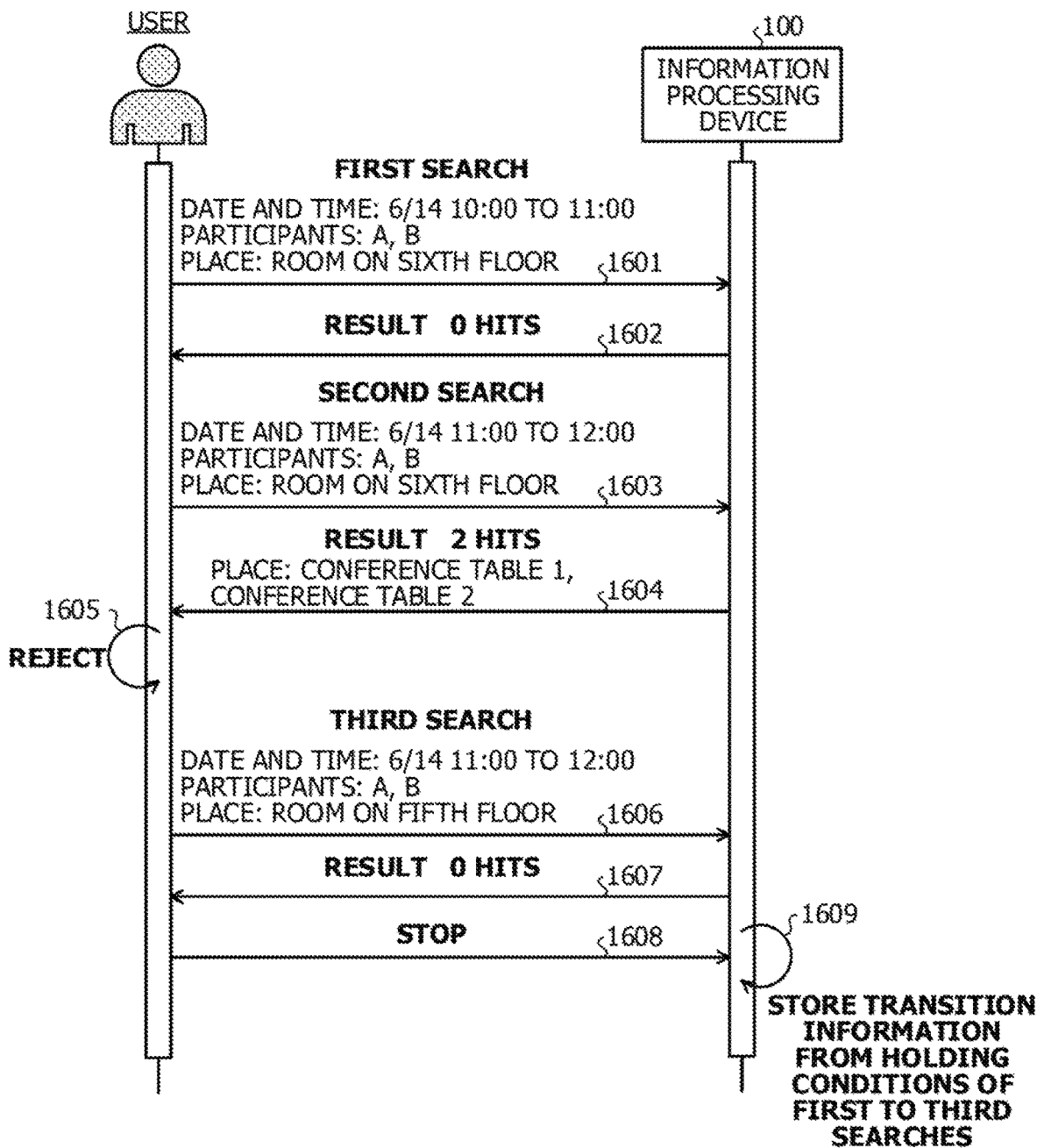

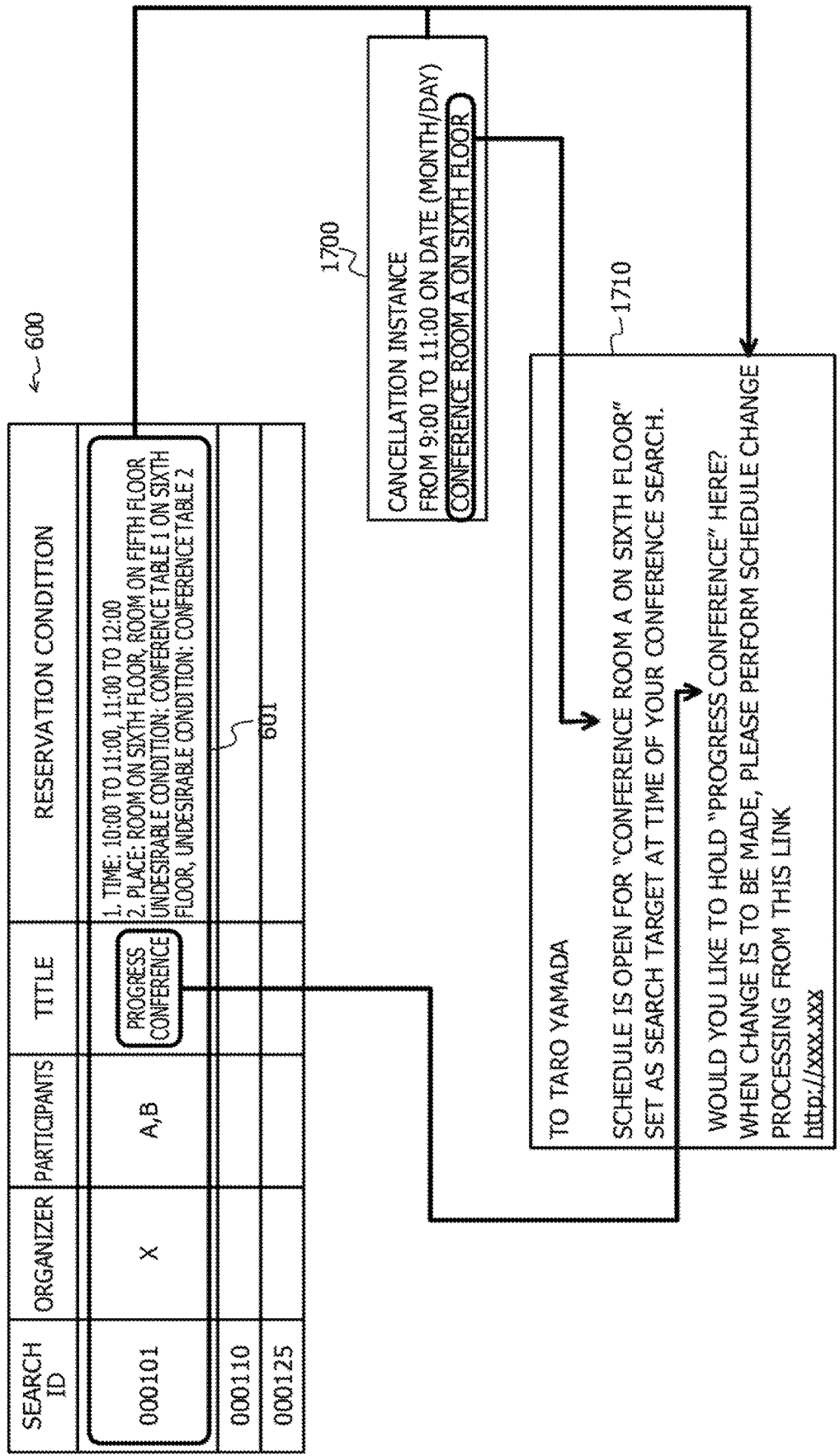

FIG. 18

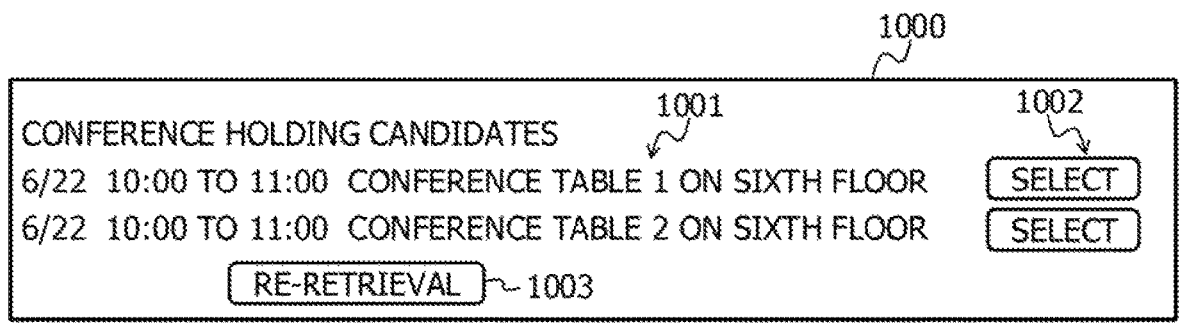

1. DATE AND TIME CONDITION: 6/22 AM, 6/22 PM, 6/22 OVERTIME
2. DATE AND TIME CONDITION: TWO HOURS, ONE HOUR
3. PLACE CONDITION: KAWASAKI INSTITUTE 6F, KAWASAKI INSTITUTE 5F
·PLACE CONDITION: PRIVATE ROOM
·PLACE CONDITION: LARGE-SIZED DISPLAY

1. DATE AND TIME CONDITION: 6/22 AM, 6/22 PM, 6/22 OVERTIME
2. DATE AND TIME CONDITION: TWO HOURS, ONE HOUR
3. PLACE CONDITION: KAWASAKI INSTITUTE 6F, KAWASAKI INSTITUTE 5F
·PLACE CONDITION: PRIVATE ROOM
·PLACE CONDITION: LARGE-SIZED DISPLAY
· UNDESIRABLE CONDITION: CONFERENCE TABLE 1 ON SIXTH FLOOR,
  UNDESIRABLE CONDITION: CONFERENCE TABLE 2 ON SIXTH FLOOR

FIG. 21
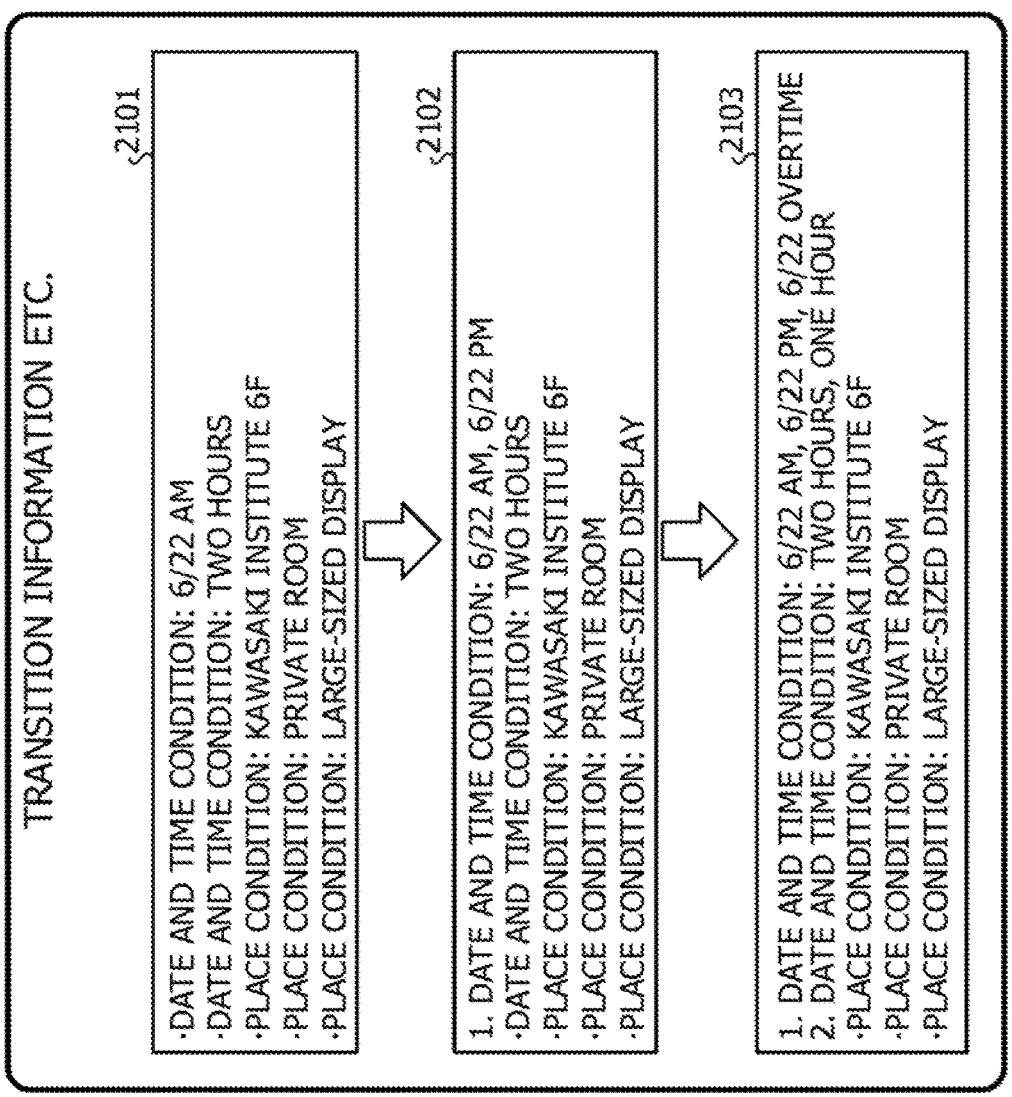
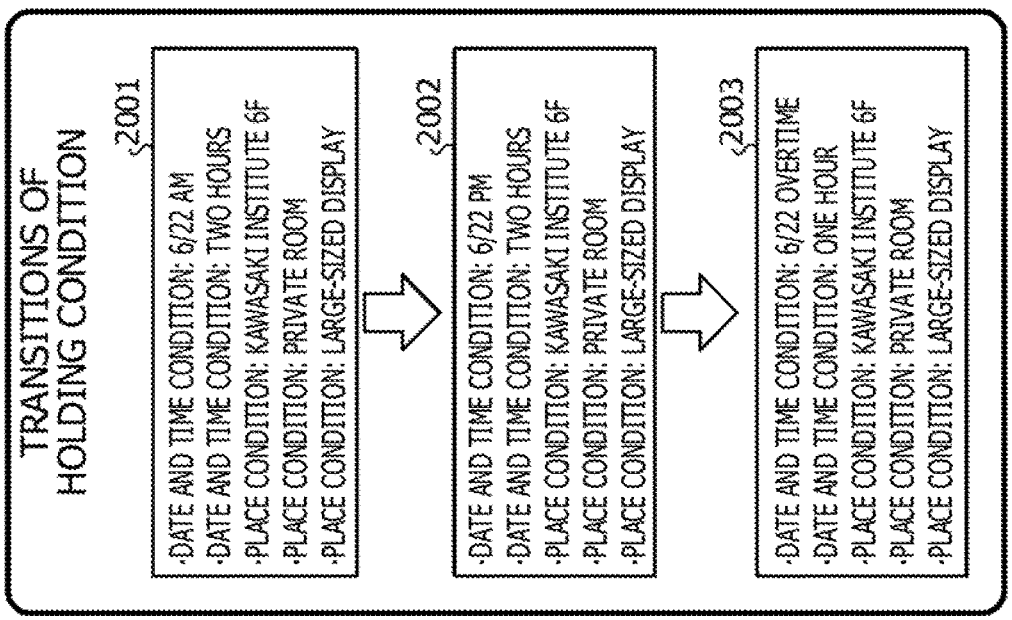

FIG. 22
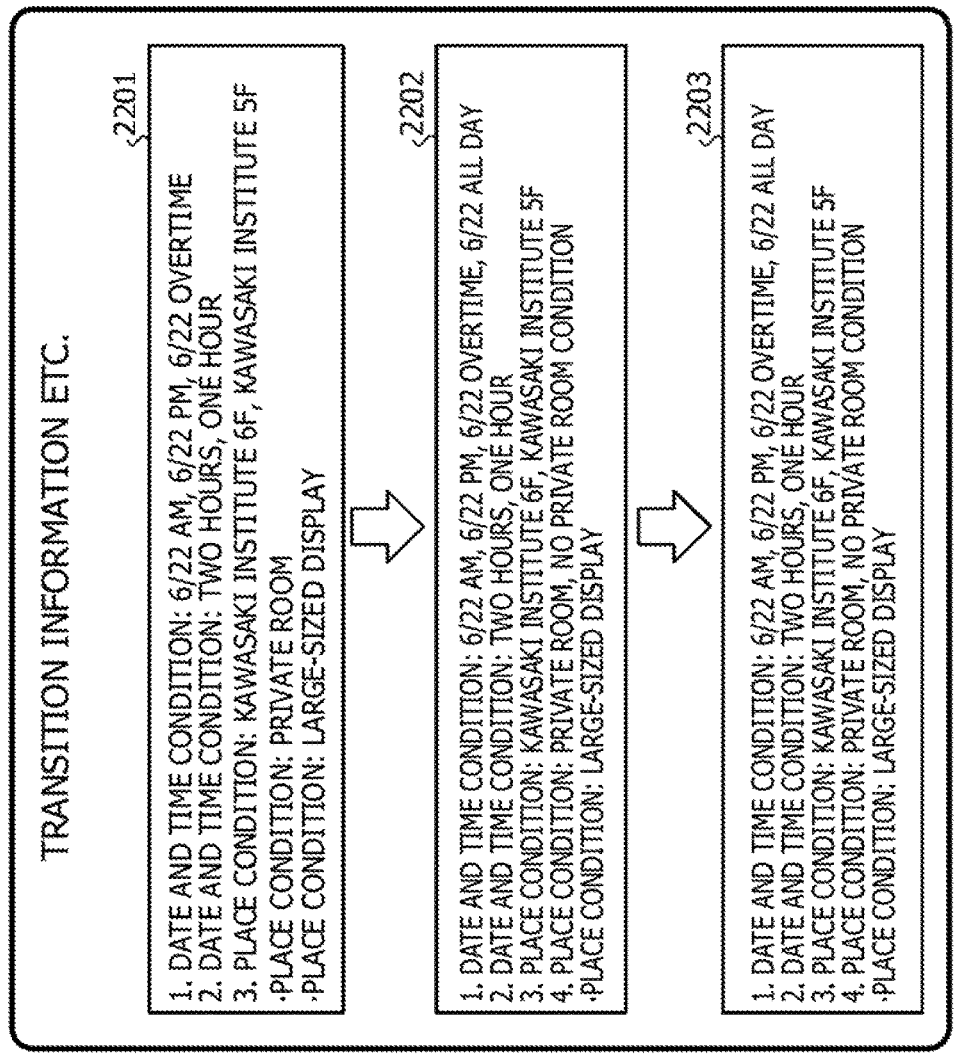
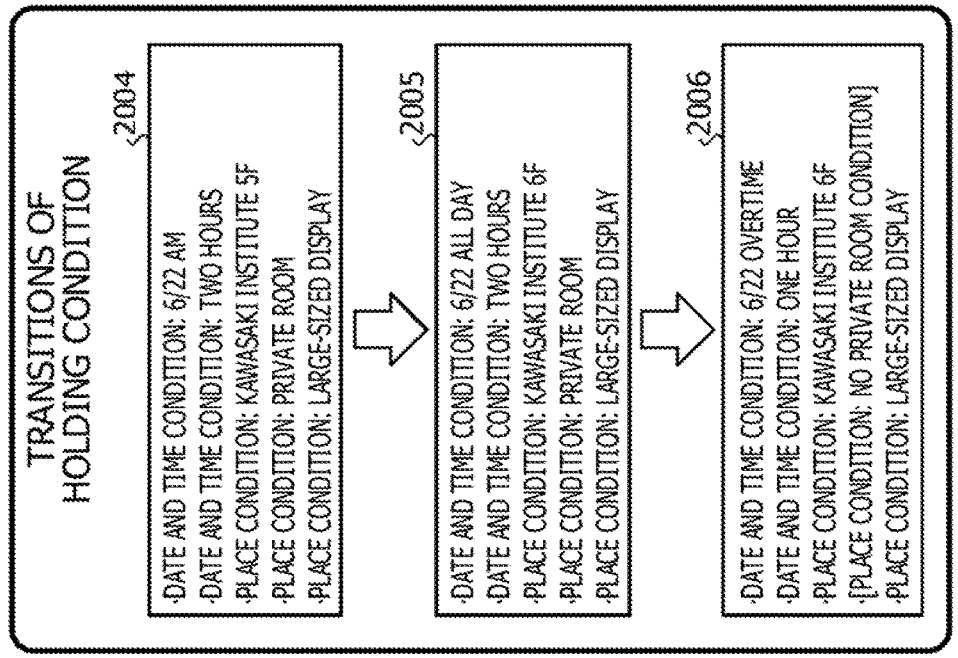

| RESERVATION ID | START TIME | END TIME | ORGANIZER | PARTICIPANTS | PLACE |
|---|---|---|---|---|---|
| 000101 | 11:00 | 12:00 | X | A,B | CONFERENCE ROOM A |
| 000110 | | | | | |
| 000125 | | | | | |

| TITLE | RESERVATION CONDITION | | |
|---|---|---|---|
| PROGRESS CONFERENCE | 1. DATE (MONTH/DAY), 10:00 TO 11:00 ROOM ON SIXTH FLOOR<br>2. DATE (MONTH/DAY), 11:00 TO 12:00, ROOM ON FIFTH FLOOR | | |

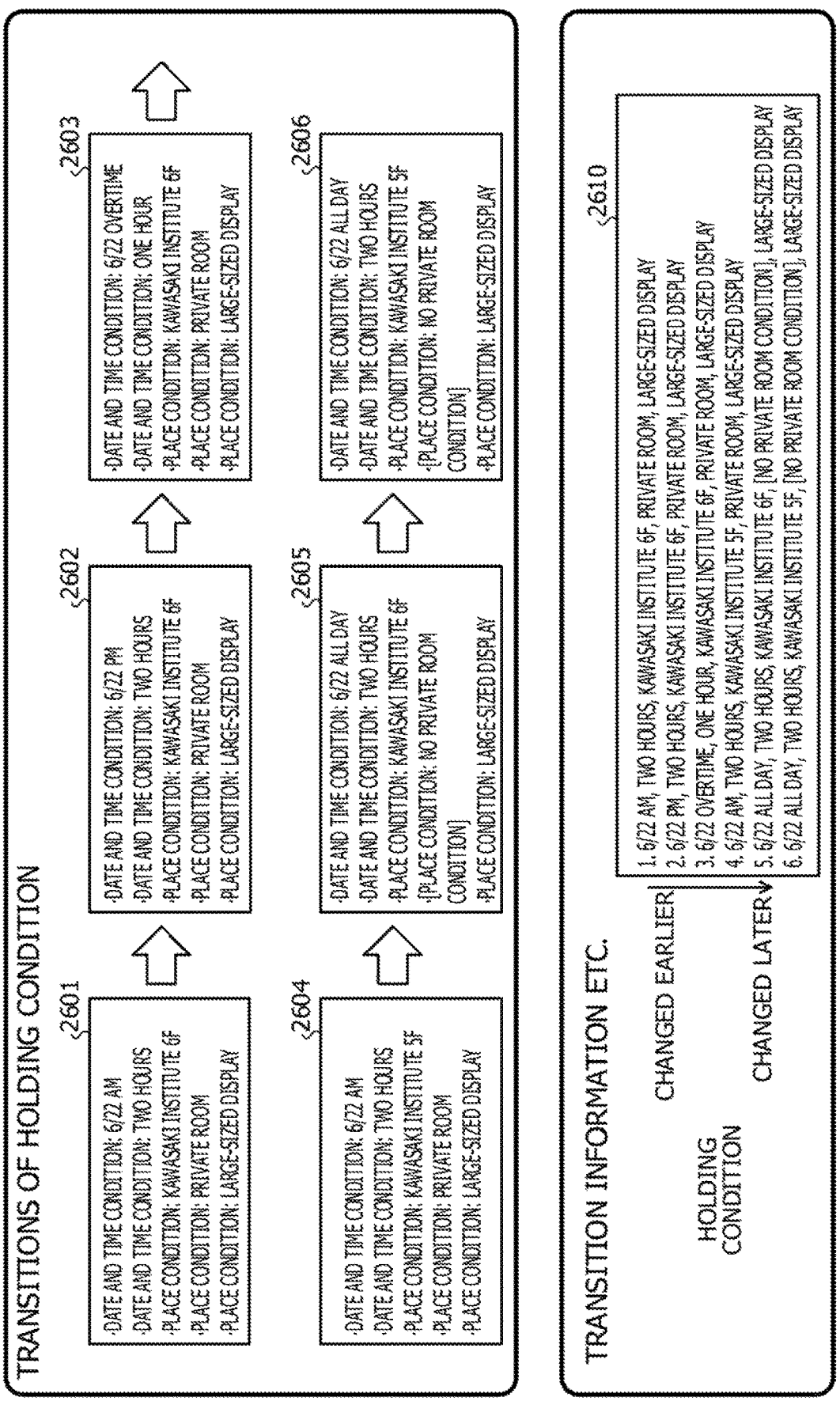

CANCELED RESOURCE
- DATE AND TIME CONDITION: 6/22 AM, ONE HOUR
- PLACE CONDITION: KAWASAKI INSTITUTE 5F, PRIVATE ROOM, LARGE-SIZED DISPLAY

INDEX VALUE
← ONE POINT
← TWO POINTS
← THREE POINTS

⟨2701⟩
1. 6/22 AM, TWO HOURS, KAWASAKI INSTITUTE 6F, PRIVATE ROOM, LARGE-SIZED DISPLAY
2. 6/22 PM, TWO HOURS, KAWASAKI INSTITUTE 6F, PRIVATE ROOM, LARGE-SIZED DISPLAY
3. 6/22 OVERTIME, ONE HOUR, KAWASAKI INSTITUTE 6F, PRIVATE ROOM, LARGE-SIZED DISPLAY
4. 6/22 AM, TWO HOURS, KAWASAKI INSTITUTE 5F, PRIVATE ROOM, LARGE-SIZED DISPLAY
5. 6/22 ALL DAY, TWO HOURS, KAWASAKI INSTITUTE 6F, [NO PRIVATE ROOM CONDITION], LARGE-SIZED DISPLAY
6. 6/22 ALL DAY, TWO HOURS, KAWASAKI INSTITUTE 5F, [NO PRIVATE ROOM CONDITION], LARGE-SIZED DISPLAY

← ONE POINT
← TWO POINTS
← THREE POINTS

⟨2702⟩
1. 6/22 AM, TWO HOURS, KAWASAKI INSTITUTE 5F, PRIVATE ROOM, LARGE-SIZED DISPLAY
2. 6/22 PM, TWO HOURS, KAWASAKI INSTITUTE 6F, PRIVATE ROOM, LARGE-SIZED DISPLAY
3. 6/22 OVERTIME, ONE HOUR, KAWASAKI INSTITUTE 6F, PRIVATE ROOM, LARGE-SIZED DISPLAY
4. 6/22 AM, TWO HOURS, KAWASAKI INSTITUTE 5F, PRIVATE ROOM, LARGE-SIZED DISPLAY
5. 6/22 ALL DAY, TWO HOURS, KAWASAKI INSTITUTE 6F, [NO PRIVATE ROOM CONDITION], LARGE-SIZED DISPLAY
6. 6/22 ALL DAY, TWO HOURS, KAWASAKI INSTITUTE 5F, [NO PRIVATE ROOM CONDITION], LARGE-SIZED DISPLAY

← ONE POINT
← TWO POINTS
← THREE POINTS

⟨2703⟩
1. 6/22 AM, TWO HOURS, KAWASAKI INSTITUTE 6F, PRIVATE ROOM, LARGE-SIZED DISPLAY
2. 6/22 PM, TWO HOURS, KAWASAKI INSTITUTE 6F, PRIVATE ROOM, LARGE-SIZED DISPLAY
3. 6/22 OVERTIME, TWO HOURS, KAWASAKI INSTITUTE 5F, PRIVATE ROOM, LARGE-SIZED DISPLAY
4. 6/22 AM, ONE HOUR, KAWASAKI INSTITUTE 6F, PRIVATE ROOM, LARGE-SIZED DISPLAY
5. 6/22 ALL DAY, TWO HOURS, KAWASAKI INSTITUTE 6F, [NO PRIVATE ROOM CONDITION], LARGE-SIZED DISPLAY
6. 6/22 ALL DAY, TWO HOURS, KAWASAKI INSTITUTE 5F, [NO PRIVATE ROOM CONDITION], LARGE-SIZED DISPLAY

RESERVATION MANAGING METHOD, AND INFORMATION PROCESSING DEVICE, AND NON-TRANSITORY COMPUTER-READABLE STORAGE MEDIUM FOR STORING RESERVATION MANAGING PROGRAM

CROSS-REFERENCE TO RELATED APPLICATION

This application is based upon and claims the benefit of priority of the prior Japanese Patent Application No. 2019-47790, filed on Mar. 14, 2019, the entire contents of which are incorporated herein by reference.

FIELD

The embodiments discussed herein are related to a reservation managing method, an information processing device, and a non-transitory computer-readable storage medium storing a reservation managing program.

BACKGROUND

There is a system that receives a search condition from a user, presents resources matching the search condition among a plurality of resources to the user, sets a reservation by the user for one of the resources, and manages a reservation state. The resources are, for example, places such as conference rooms, sports facilities, or the like, media such as music media, video media, or the like, or vehicles such as bicycles, automobiles, or the like.

There is a technology that, when cancellation information for an already reserved plan is received, for example, and it is estimated that the cancellation information is transmitted for a reason of the weather, extracts a recommended plan based on weather forecast information, and outputs the recommended plan to a reserving party terminal corresponding to the already reserved plan.

Examples of the related art include International Publication Pamphlet No. WO2017/163379.

SUMMARY

According to an aspect of the embodiments, a reservation managing method implemented by a computer, the reservation managing method includes: executing first processing in response to receiving of a condition for searching for a resource, the received condition being a condition specified from a user, the first processing including searching for a resource matching the received condition among a plurality of resources; storing information about transition of the condition for searching for a resource in a memory in association with the user based on a condition when a reservation by the user is not set among the received conditions; and outputting a notification that a reservation for one resource of the plurality of resources may be set to the user when a reservation for the one resource is canceled, and when the one resource matches the condition identified from the information stored in the memory in association with the user.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is an explanatory diagram illustrating an example of contents stored in a reservation stop DB;

FIG. 9 is an explanatory diagram (1) illustrating an example of receiving a holding condition in a first operation example;

FIG. 11 is an explanatory diagram (1) illustrating another example of receiving a holding condition in a first operation example;

FIG. 12 is an explanatory diagram (2) illustrating another example of receiving a holding condition in a first operation example;

FIG. 13 is an explanatory diagram (3) illustrating another example of receiving a holding condition in a first operation example;

FIG. 14 is an explanatory diagram (1) illustrating an example of outputting a notification to a user after a reservation by the user is set in a first operation example;

FIG. 16 is an explanatory diagram (1) illustrating an example of outputting a notification to a user after reservation by the user is stopped in the first operation example;

FIG. 17 is an explanatory diagram (2) illustrating an example of outputting a notification to a user after reservation by the user is stopped in the first operation example;

FIG. 18 is an explanatory diagram (1) illustrating an example of registering undesirable conditions in a first operation example;

FIG. 21 is an explanatory diagram (2) illustrating details of storing information about transitions of a holding condition in a first operation example;

FIG. 22 is an explanatory diagram (3) illustrating details of storing information about transitions of a holding condition in a first operation example;

FIG. 24 is an explanatory diagram (1) illustrating an example of outputting a notification to a user after a reservation by the user is set in a second operation example;

FIG. 26 is an explanatory diagram illustrating details of storing information about transitions of a holding condition in a second operation example;

FIG. 27 is an explanatory diagram illustrating details of identifying a user as a target to which to output a notification in a second operation example;

DESCRIPTION OF EMBODIMENTS

However, when a reservation by a user for a resource is canceled, and the resource is desired to be utilized by another user, it is difficult to determine the user to whom to output a notification that the reservation is canceled. For example, it is difficult to estimate whether a resource whose reservation by a user is canceled is desired to be used by another user.

In one aspect, it is an object of the present invention to narrow down users to be notified that a reservation for a resource is canceled.

According to one aspect, users to be notified that a reservation for a resource is canceled may be narrowed down.

Embodiments of a reservation managing method, a reservation managing program, and an information processing device 100 according to the present invention will hereinafter be described in detail with reference to the drawings.

(One Example of Reservation Managing Method According to Embodiment)

Figure 1:
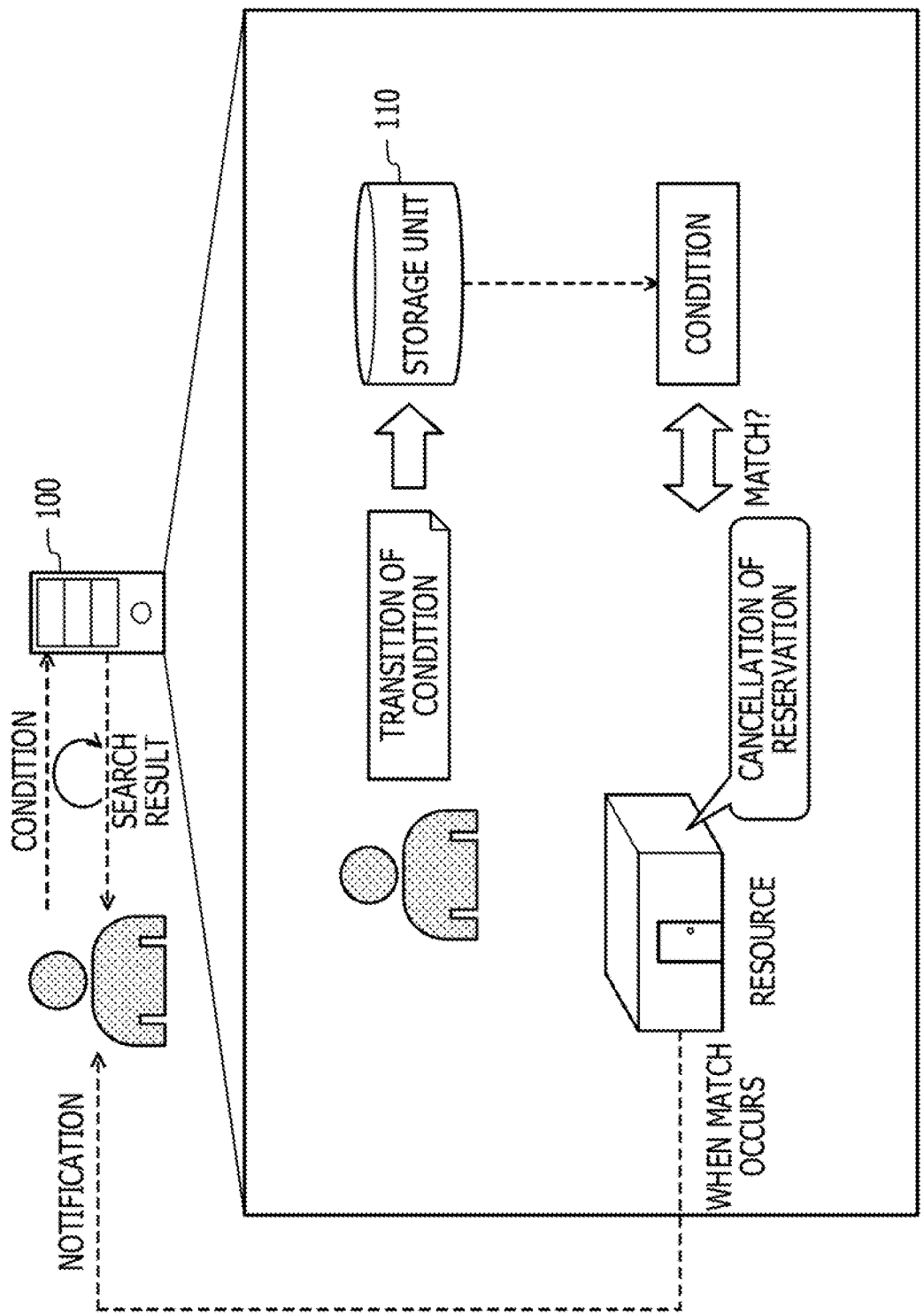
FIG. 1 is an explanatory diagram illustrating one example of a reservation managing method according to an embodiment.

FIG. 1 is an explanatory diagram illustrating one example of a reservation managing method according to an embodiment. In FIG. 1, an information processing device 100 is a computer that manages states of reservations for resources. The resources are, for example, places such as conference rooms, sports facilities, or the like, media such as music media, video media, or the like, or vehicles such as bicycles, automobiles, or the like.

There is a system that receives a search condition from a user, presents resources matching the search condition among a plurality of resources to the user, sets a reservation by the user for one of the resources, and manages a reservation state. It is desired that control be performed so as to enable each of a plurality of users using the system to set a reservation for a resource desired to be used with a high priority among the plurality of resources, and that the whole of the plurality of users utilize the plurality of resources effectively. The priority is a priority for the user, and is treated as a value that increases as the degree of a desire to use the resource is estimated to be stronger.

When a reservation by a user for one resource is canceled, the resource whose reservation is canceled is not readily utilized effectively. Therefore, it may be desired that when a reservation by a user for one resource is canceled, the resource whose reservation is canceled be utilized by another user, and thereby the resource whose reservation is canceled be utilized effectively.

On the other hand, after a reservation by a user for one resource is canceled, a wait may be performed for some different user to set a reservation for the resource whose reservation is canceled. However, the reservation is not necessarily set by a user desiring to use the resource in question. For example, a user desiring most to use the resource may not notice that the reservation is canceled, the user being such a user as gave up using the resource because the resource that the user desires most to use is already reserved, and it may be difficult for the user to set a reservation for the resource whose reservation is canceled. As a result, it is difficult to utilize the plurality of resources effectively among the whole of the plurality of users.

Therefore, it may be desirable that when a reservation by a user for one resource is canceled, a notification that the reservation by the user for the one resource is canceled be output to a user desiring to use the resource whose reservation is canceled.

However, it is difficult to determine to which other user to output the notification that the reservation by the user for the one resource is canceled. For example, it is difficult to estimate which other user desires to use the resource whose reservation is canceled. It is therefore difficult to determine to which other user to output the notification that the reservation is canceled.

On the other hand, there may be a method which receives a specification of a resource for which to wait for cancellation of a reservation from a user, and outputs a notification that the specified resource is canceled to the user when the specified resource is canceled. With such a method, it is difficult to utilize the plurality of resources effectively among the whole of the plurality of users.

For example, even when a user gives up a reservation for a resource that the user desires most to use, the user compromises by reserving a resource that the user desires second most to use, and the user tends not to wait for the cancellation of the resource that the user desires most to use when a reservation for the resource that the user desires second most to use can be set. Therefore, even when a reservation for the resource that the user desires most to use is canceled, it is difficult to output the notification that the reservation for the resource is canceled to the user.

In addition, for example, in a situation in which a plurality of users wait for cancellation of a reservation for a same resource, it is difficult to determine to which of the plurality of users to output a notification that the reservation for the resource is canceled. Therefore, it is difficult to enable a user desiring most to use the resource whose reservation is canceled among the plurality of users to set a reservation for the resource whose reservation is canceled. It is thus difficult to utilize the resource effectively. In addition, for example, the users specify the resource for which the users wait for cancellation of the reservation. This invites an increase in a work load on the users.

Accordingly, in the present embodiment, description will be made of a reservation managing method that may output a notification that a reservation for a resource is canceled to a user in consideration of an intention of the user based on information about transition of a condition for searching for a resource, the condition being specified by the user. Such a reservation managing method may facilitate the usage of a resource that the user desires to use with a high priority while suppressing an increase in a work load on the user, and may thus improve the convenience of the user and make the resource utilized effectively.

In FIG. 1, (1-1) the information processing device 100 receives a condition for searching for a resource, the condition being specified from a user. The condition may be a combination of an item condition of each of one or more items of a plurality of items. Each time the information processing device 100 receives a condition for searching for a resource, the condition being specified from the user, the information processing device 100 searches for a resource matching the received condition among a plurality of resources. The information processing device 100 presents a search result to the user, and sets a reservation for the resource selected by the user.

(1-2) The information processing device 100 generates information about transition of the condition for searching for a resource based on a condition when a reservation by the user is not set among conditions received in the past, and stores the information in a storage unit 110 in association with the user. The generated information for example includes information in which the conditions received in the past are arranged in time series order. In a case where the condition is a combination of an item condition of each of one or more items of a plurality of items, the generated information may for example include information in which item conditions received in the past are arranged in time series order for each item. In addition, in such a case, the generated information may for example include information in which the plurality of items are arranged in ascending order of timing in which item conditions are changed for the first time in the plurality of items.

According to this, the information processing device 100 may store, in the storage unit 110, information reflecting an intention when the user attempts to set a reservation. Therefore, the information processing device 100 may refer to the storage unit 110, and identify a resource for which the user is determined to desire to set a reservation and identify the degree of a priority with which the user desires to use each of the plurality of resources.

(1-3) When a reservation for one resource of the plurality of resources is canceled, the information processing device 100 determines whether or not the one resource whose reservation is canceled matches a condition identified from the information stored in the storage unit 110 in association with the user. The identified condition is a condition identifying a resource for which the user is determined to desire to set a reservation. The identified condition is for example a condition received in the past. The identified condition may be a combination of item conditions received in the past. Matching may be satisfaction of a part of the item conditions received in the past. When the information processing device 100 determines that the one resource whose reservation is canceled matches the condition identified from the information stored in the storage unit 110 in association with the user, the information processing device 100 outputs a notification that a reservation for the one resource can be set to the user. When the information processing device 100 determines that the one resource whose reservation is canceled does not match the condition identified from the information stored in the storage unit 110 in association with the user, the information processing device 100 does not output the notification that a reservation for the one resource can be set to the user.

According to this, the information processing device 100 may determine whether or not to output a notification that a reservation for the resource is canceled to the user in consideration of an intention of the user based on the information about the transition of the condition for searching for a resource, the condition being specified by the user. The information processing device 100 may for example output a notification that a reservation for the resource is canceled and that a new reservation can be set for the resource only to the user who desires to use the resource whose reservation is canceled with a relatively high priority. Thus, the information processing device 100 may narrow down users to whom to output the notification that the reservation for the resource is canceled.

Therefore, the user may receive the notification when the reservation for the resource desired to be used with a relatively high priority is canceled even when the user does not spontaneously perform an operation of registering the resource desired to be used with a relatively high priority. In addition, the user may not receive the notification when a reservation for a resource desired to be used with a relative low priority is canceled. Hence, the information processing device 100 may facilitate the setting of a reservation for the resource desired to be used by the user with a high priority while suppressing an increase in a work load on the user, and may therefore improve the convenience of the user.

There may be a case where after a reservation by the user for one resource is canceled, a wait is performed for some user to set a reservation for the resource whose reservation is canceled. In such a case, it is difficult for a user desiring to use the resource whose reservation is canceled to know that the reservation is canceled unless the user checks the reservation state intermittently. Therefore, it is difficult for the user desiring to use the resource whose reservation is canceled to set a new reservation for the resource whose reservation is canceled, and an increase in a work load on the user is incurred.

On the other hand, the information processing device 100 may determine whether or not to output a notification that a reservation for the resource is canceled to the user based on the information about the transition of the condition for searching for a resource, the condition being specified by the user. Therefore, the information processing device 100 may relieve the user of a need to check the reservation state on his/her own. As a result, the information processing device 100 may facilitate the setting of a reservation for the resource that the user desires to use with a high priority while suppressing an increase in a work load on the user, and may therefore improve the convenience of the user and make the resource utilized effectively.

In addition, there may be a case where a specification of a resource for which to wait for cancellation of a reservation is received from a user, and when the reservation for the specified resource is canceled, a notification that the reservation for the specified resource is canceled is output to the user. In such a case, the user needs to perform an operation of specifying the resource for which to wait for cancellation of the reservation, and thus an increase in a work load on the user is incurred.

On the other hand, the information processing device 100 may determine whether or not to output a notification that a reservation for the resource is canceled to the user based on the information about the transition of the condition for searching for a resource, the condition being specified by the user. Therefore, the information processing device 100 may facilitate the setting of a reservation for the resource that the user desires to use with a high priority while suppressing an increase in a work load on the user, and may therefore improve the convenience of the user and make the resource utilized effectively.

In addition, receiving the notification, the user may cancel a reservation previously set by the user himself/herself, and set a new reservation for the resource indicated by the received notification. Then, in response to the cancellation of the reservation by the user receiving the notification, the information processing device 100 may output a notification to another user who desires to use the resource whose reservation is canceled with a relatively high priority. As a result, the information processing device 100 may enable each user of the whole of the plurality of users to set a reservation for a resource desired to be used with a relatively high priority, and may enable the whole of the plurality of resources to be utilized effectively.

The above description has been made of a case where the information processing device 100 determines, for each user, whether or not to output a notification that a reservation for a resource can be set. However, there is no limitation to this. For example, there may be a case where the information processing device 100 determines to which of the plurality of users to output a notification that a reservation for a resource can be set. In such a case, the information processing device 100 may determine order in which to issue a notification to each user in consideration of the above-described priority in order to avoid contention between a plurality of users.

(One Example of Reservation Management System 200)

Figure 2:
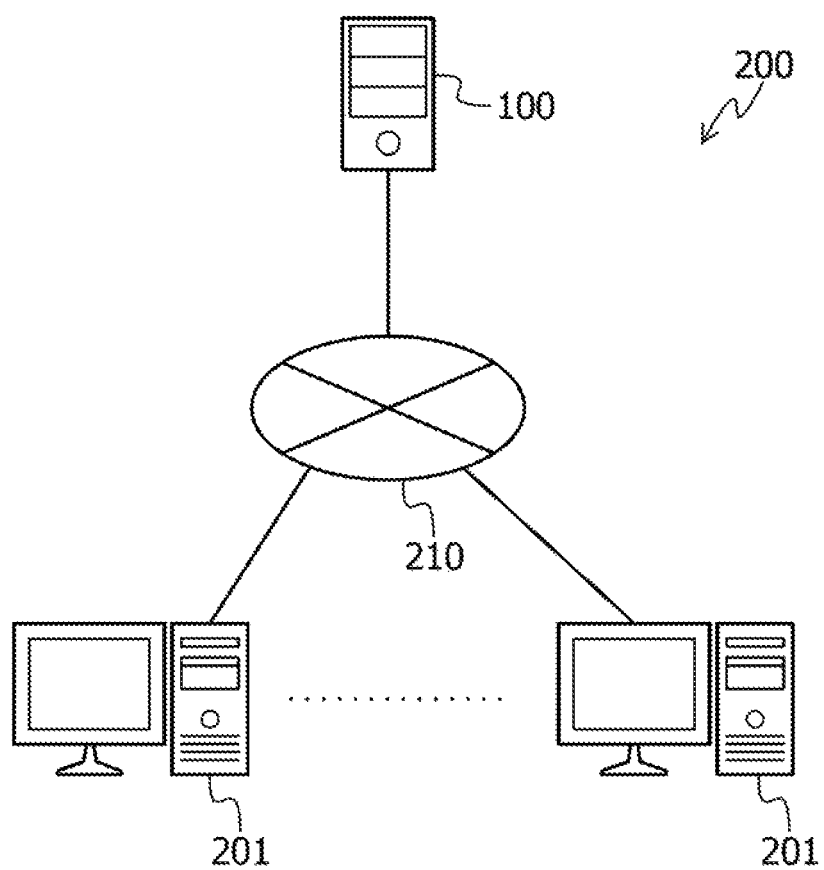
FIG. 2 is an explanatory diagram illustrating an example of a reservation management system.

Referring to FIG. 2, description will next be made of an example of a reservation management system 200 to which the information processing device 100 illustrated in FIG. 1 is applied.

FIG. 2 is an explanatory diagram illustrating an example of the reservation management system 200. In FIG. 2, the reservation management system 200 includes the information processing device 100 and a terminal device 201. In the reservation management system 200, the information processing device 100 is coupled to the terminal device 201 via a wired or wireless network 210. The network 210 is, for example, a local area network (LAN), a wide area network (WAN), the Internet, or the like.

The information processing device 100 stores various kinds of databases (DBs) to be described later with reference to FIGS. 4 to 6. The information processing device 100 receives, from the terminal device 201, a condition for searching for resources, the condition being specified from a user. The information processing device 100 refers to a resource management DB 400 to be described later with reference to FIG. 4, searches a plurality of resources for resources matching the received condition, and transmits a result of the search to the terminal device 201. When the information processing device 100 receives a setting request requesting a reservation for one resource to be set from the terminal device 201, the information processing device 100 sets a reservation for the one resource.

The information processing device 100 stores information about transitions of the condition for searching for resources, the condition being specified by the user, in association with the user by using various kinds of DBs to be described later with reference to FIG. 5 and FIG. 6. When a reservation for a resource is canceled, the information processing device 100 refers to the various kinds of DBs to be described later with reference to FIG. 5 and FIG. 6, and identifies a user as a target to which to output a notification that a reservation for the resource may be set. The information processing device 100 outputs the notification that a reservation for the resource may be set to the identified user. The information processing device 100 is, for example, a server, a personal computer (PC), or the like.

The terminal device 201 is a computer used by the user who sets a reservation for a resource. The terminal device 201 receives a specification of a condition for searching for resources based on an operating input of the user, and transmits the condition for searching for resources, the condition being specified from the user, to the information processing device 100. The terminal device 201 receives a result of search from the information processing device 100, and displays the result of the search. The terminal device 201 transmits a setting request requesting a reservation to be set for a certain resource to the information processing device 100 based on an operating input of the user. The terminal device 201 is, for example, a PC, a tablet terminal, a smart phone, or the like.

Concrete Example (1) of Reservation Management System 200

Description will next be made of a concrete example (1) of the reservation management system 200. Conceivable as a concrete example (1) of the reservation management system 200 is, for example, a concrete example in a case where resources are places. The places are, for example, conference rooms, sports facilities, or the like. The sports facilities are, for example, a tennis court, a golf course, or the like. A condition is, for example, a condition for searching for a conference room in which to hold a conference. In the following description, a condition for searching for a conference room in which to hold a conference may be described as a "holding condition."

Concrete Example (2) of Reservation Management System 200

Description will next be made of a concrete example (2) of the reservation management system 200. Conceivable as a concrete example (2) of the reservation management system 200 is, for example, a concrete example in a case where resources are objects to be rented. The objects are media such as books, music media, video media, or the like or vehicles such as bicycles, automobiles, or the like. A condition is, for example, a condition for searching for a book to be rented.

Concrete Example (3) of Reservation Management System 200

Description will next be made of a concrete example (3) of the reservation management system 200. Conceivable as a concrete example (3) of the reservation management system 200 is, for example, a concrete example in a case where resources are employees providing services. The services are, for example, beauty salon treatment, a haircut, and the like. A condition is a condition for searching for an employee.

The above description has been made of a case where the information processing device 100 is a device different from the terminal device 201. However, there is no limitation to the case. For example, there may be a case where the information processing device 100 is integral with the terminal device 201. In the following description, description will be made of operation of the information processing device 100 with the above-described concrete example (1) of the reservation management system 200 as an example.

(Example of Hardware Configuration of Information Processing Device 100)

An example of a hardware configuration of an information processing device will next be described with reference to FIG. 3.

Figure 3:
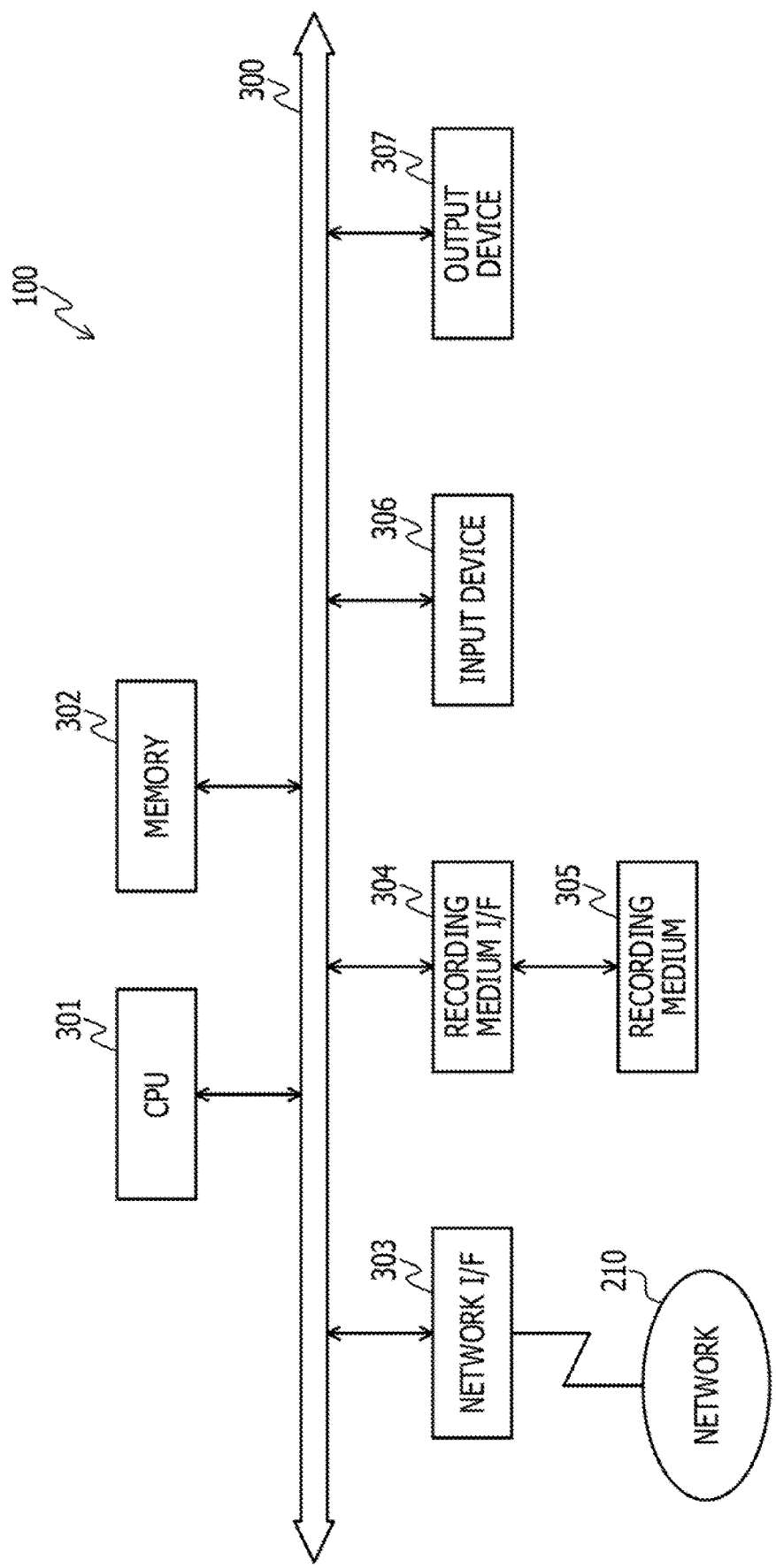
FIG. 3 is a block diagram illustrating an example of a hardware configuration of an information processing device.

FIG. 3 is a block diagram illustrating an example of a hardware configuration of an information processing device. The information processing device illustrated in FIG. 3 may be the information processing device 100 in FIG. 1. In FIG. 3, the information processing device 100 includes a central processing unit (CPU) 301, a memory 302, a network interface (I/F) 303, a recording medium I/F 304, a recording medium 305, an input device 306, and an output device 307. In addition, each of the constituent units is coupled by a bus 300.

The CPU 301 is in charge of control of the whole of the information processing device 100. The memory 302 includes, for example, a read only memory (ROM), a random access memory (RAM), a flash ROM, and the like. For example, the flash ROM and the ROM store various kinds of programs, and the RAM is used as a work area of the CPU 301. A program stored in the memory 302 makes the CPU 301 perform coded processing by being loaded into the CPU 301.

The network I/F 303 is coupled to the network 210 through a communication line, and is coupled to another computer via the network 210. The network I/F 303 is in charge of an interface between the network 210 and the inside, and controls data input and output from the other computer. The network I/F 303 is, for example, a modem, a LAN adapter, or the like.

The recording medium I/F 304 controls the reading/writing of data to and from the recording medium 305 under control of the CPU 301. The recording medium I/F 304 is, for example, a disk drive, a solid state drive (SSD), a universal serial bus (USB) port, or the like. The recording medium 305 is a nonvolatile memory that stores data written by the control of the recording medium I/F 304. The recording medium 305 is, for example, a disk, a semiconductor memory, a USB memory, or the like. The recording medium 305 may be detachable from the information processing device 100.

The input device 306 is a device that performs data input. The input device 306, for example, includes keys for input of characters, numbers, various kinds of instructions, and the like, and performs data input. For example, the input device 306 is a keyboard, a mouse, and the like. In addition, for example, the input device 306 may be a touch panel type input pad, numeric keys, or the like. Alternatively, for example, the input device 306 may be a microphone or the like.

The output device 307 is a device that performs data output. The output device 307 is a display that displays data such as documents, images, function information, or the like, including a cursor, an icon, or a tool box. The display is, for example, a cathode ray tube (CRT), a liquid crystal display, an organic electroluminescence (EL) display, or the like. The output device 307 may be, for example, a printer, a scanner, a speaker, or the like.

The information processing device 100 may not include the input device 306 and the output device 307. In addition, the information processing device 100 may include a plurality of recording media I/F 304 and a plurality of recording media 305. In addition, the information processing device 100 may not include the recording medium I/F 304 and the recording medium 305.

(Contents Stored in Resource Management DB 400)

An example of contents stored in the resource management DB 400 will next be described with reference to FIG. 4. The resource management DB 400 is, for example, implemented by a storage area of the memory 302 of the information processing device 100 or the recording medium 305 illustrated in FIG. 3 or the like. In the example of FIG. 4, resources are conference rooms.

Figure 4:
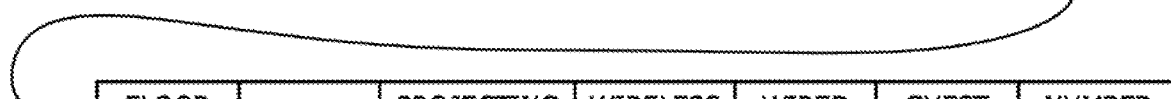
FIG. 4 is an explanatory diagram illustrating an example of contents stored in a resource management DB.

FIG. 4 is an explanatory diagram illustrating an example of contents stored in the resource management DB 400. As illustrated in FIG. 4, the resource management DB 400 includes fields of a name, an abbreviated name, a place of business, a nearest station, a building, a floor number, a division, a projecting apparatus, a wireless LAN, a wired LAN, a guest usage, and the number of people. In the resource management DB 400, reservation change information is stored by setting information in each field for each conference room as a resource.

The name of a conference room, the name being used as an identification (ID), is set in the field of the name. An abbreviated name of the conference room is set in the field of the abbreviated name. The abbreviated name may be used to identify the conference room in a case where the abbreviated name is input by the user.

The name of a place of business in which the conference room is present is set in the field of the place of business. The name of a station nearest to the place of business in which the conference room is present is set in the field of the nearest station. The name of a building in which the conference room is present is set in the field of the building. The number of a floor on which the conference room is present is set in the field of the floor number. The name of a division in which the conference room is present is set in the field of the division.

Whether or not there is a projecting apparatus in the conference room is set in the field of the projecting apparatus. An attribute of the projecting apparatus present in the conference room may be further set in the field of the projecting apparatus. Whether or not there is wireless LAN equipment in the conference room is set in the field of the wireless LAN. An attribute of the wireless LAN equipment present in the conference room may be further set in the field of the wireless LAN. Whether or not there is wired LAN equipment in the conference room is set in the field of the wired LAN. An attribute of the wired LAN equipment present in the conference room may be further set in the field of the wired LAN.

Whether or not a guest may use the conference room is set in the field of the guest usage. The guest is, for example, a person outside a company providing the conference room, the person not belonging to the company. The number of people that may be accommodated in the conference room is set in the field of the number of people.

(Contents Stored in Reservation Management DB 500)

An example of contents stored in a reservation management DB 500 will next be described with reference to FIG. 5. The reservation management DB 500 is, for example, implemented by a storage area of the memory 302 of the information processing device 100 or the recording medium 305 illustrated in FIG. 3 or the like.

Figure 5:
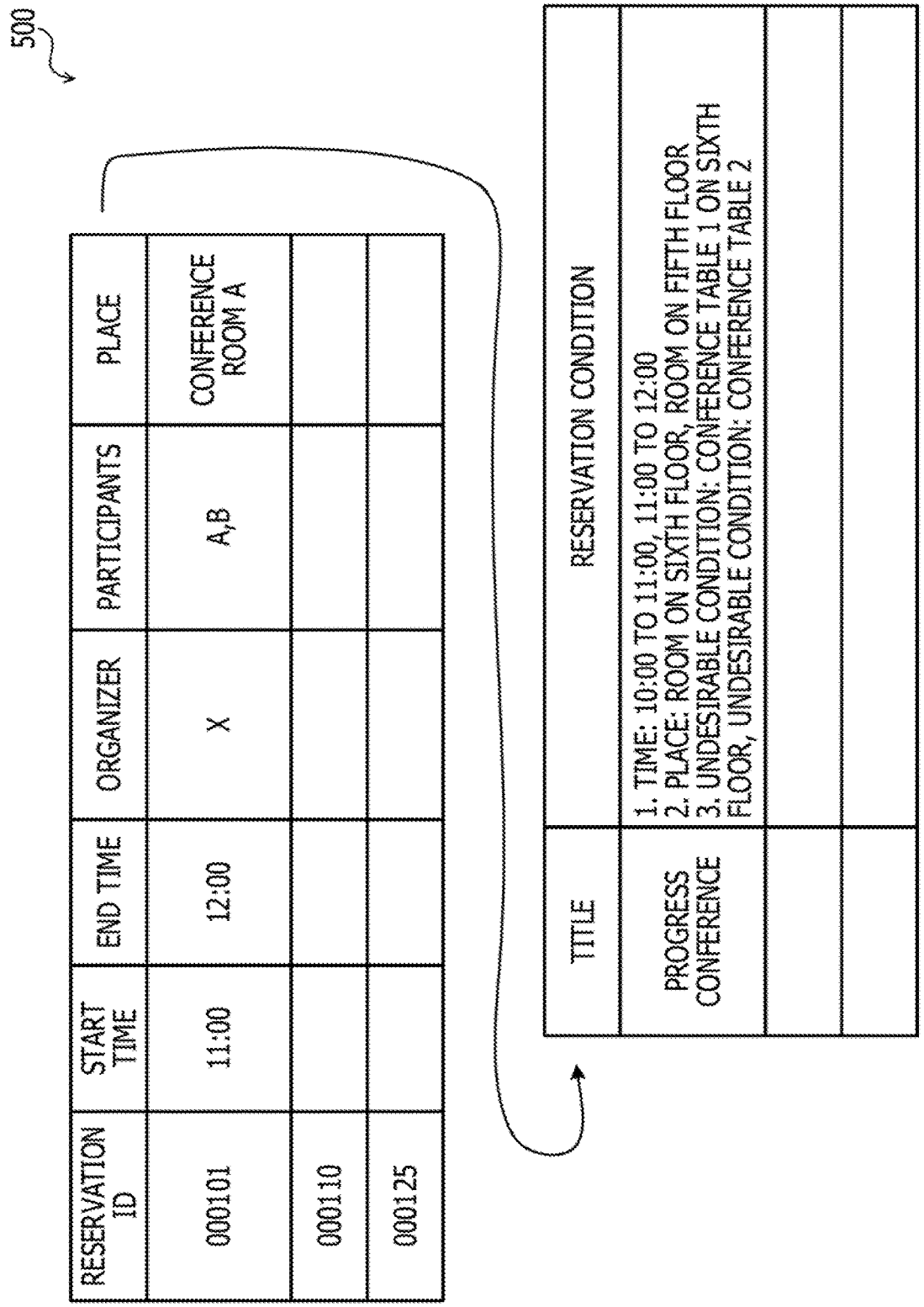
FIG. 5 is an explanatory diagram illustrating an example of contents stored in a reservation management DB.

FIG. 5 is an explanatory diagram illustrating an example of contents stored in the reservation management DB 500. As illustrated in FIG. 5, the reservation management DB 500 includes fields of a reservation ID, a start time, an end time, an organizer, participants, a place, a title, and a reservation condition. In the reservation management DB 500, reservation information is stored by setting information in each field for each conference reservation.

A reservation ID identifying a conference reservation is set in the field of the reservation ID. A start time of a holding time period of a reservation target conference is set in the field of the start time. An end time of the holding time period of the reservation target conference is set in the field of the end time.

The name of a user who is an organizer of the reservation target conference and sets the conference reservation is set in the field of the organizer. The names of participants in the reservation target conference are set in the field of the participant. The name of a conference room for which the conference reservation is set is set in the field of the place. A title given to the conference is set in the field of the title. Set in the field of the reservation condition is information about transitions of a holding condition for searching for the conference room, the holding condition being specified by the user, when the conference reservation is set. Undesirable conditions indicating conference rooms for which the conference reservation is not set may be further set in the field of the reservation condition.

Set in the field of the reservation condition is information about transitions of the holding condition for searching for a conference room, the holding condition being specified by the user, as illustrated in a first operation example to be described later with reference to FIGS. 9 to 23, for example. Set in the field of the reservation condition is, for example, information in which item conditions received in the past are arranged in time series order for each item and information in which a plurality of items are arranged in ascending order of timing in which item conditions are changed for the first time in the plurality of items.

In addition, information may be set in the field of the reservation condition, the information being related to transitions of the holding condition for searching for a conference room, the holding condition being specified by the user, as illustrated in a second operation example to be described later with reference to FIGS. 24 to 27, for example. Set in the field of the reservation condition is, for example, information in which holding conditions for searching for a conference room, the holding conditions being received in the past, are arranged in time series order.

(Contents Stored in Reservation Stop DB 600)

An example of contents stored in a reservation stop DB 600 will next be described with reference to FIG. 6. The reservation stop DB 600 is, for example, implemented by a storage area of the memory 302 of the information processing device 100 or the recording medium 305 illustrated in FIG. 3 or the like.

FIG. 6 is an explanatory diagram illustrating an example of contents stored in the reservation stop DB 600. As illustrated in FIG. 6, the reservation stop DB 600 includes fields of a search ID, an organizer, participants, a title, and a reservation condition. In the reservation stop DB 600, reservation stop information is stored by setting information in each field for each piece of reservation work until conference reservation is stopped.

A search ID identifying the reservation work until the conference reservation is stopped is set in the field of the search ID. The name of a user who is an organizer of a reservation target conference and stops the conference reservation is set in the field of the organizer. The names of participants in the reservation target conference are set in the field of the participants. A title given to the conference is set in the field of the title. Set in the field of the reservation condition is information about transitions of a holding condition for searching for a conference room, the holding condition being specified by the user, before the conference reservation is stopped. Undesirable conditions indicating conference rooms for which the conference reservation is not set may be further set in the field of the reservation condition.

Set in the field of the reservation condition is information about transitions of the holding condition for searching for a conference room, the holding condition being specified by the user, as illustrated in the first operation example to be described later with reference to FIGS. 9 to 23, for example. Set in the field of the reservation condition is, for example, information in which item conditions received in the past are arranged in time series order for each item and information in which a plurality of items are arranged in ascending order of timing in which item conditions are changed for the first time in the plurality of items.

In addition, information may be set in the field of the reservation condition, the information being related to transitions of the holding condition for searching for a conference room, the holding condition being specified by the user, as illustrated in the second operation example to be described later with reference to FIGS. 24 to 27, for example. Set in the field of the reservation condition is, for example, information in which holding conditions for searching for a conference room, the holding conditions being received in the past, are arranged in time series order.

(Example of Hardware Configuration of Terminal Device 201)

Next, referring to FIG. 7, description will be made of an example of a hardware configuration of a terminal device 201 included in the reservation management system 200 illustrated in FIG. 2.

Figure 7:
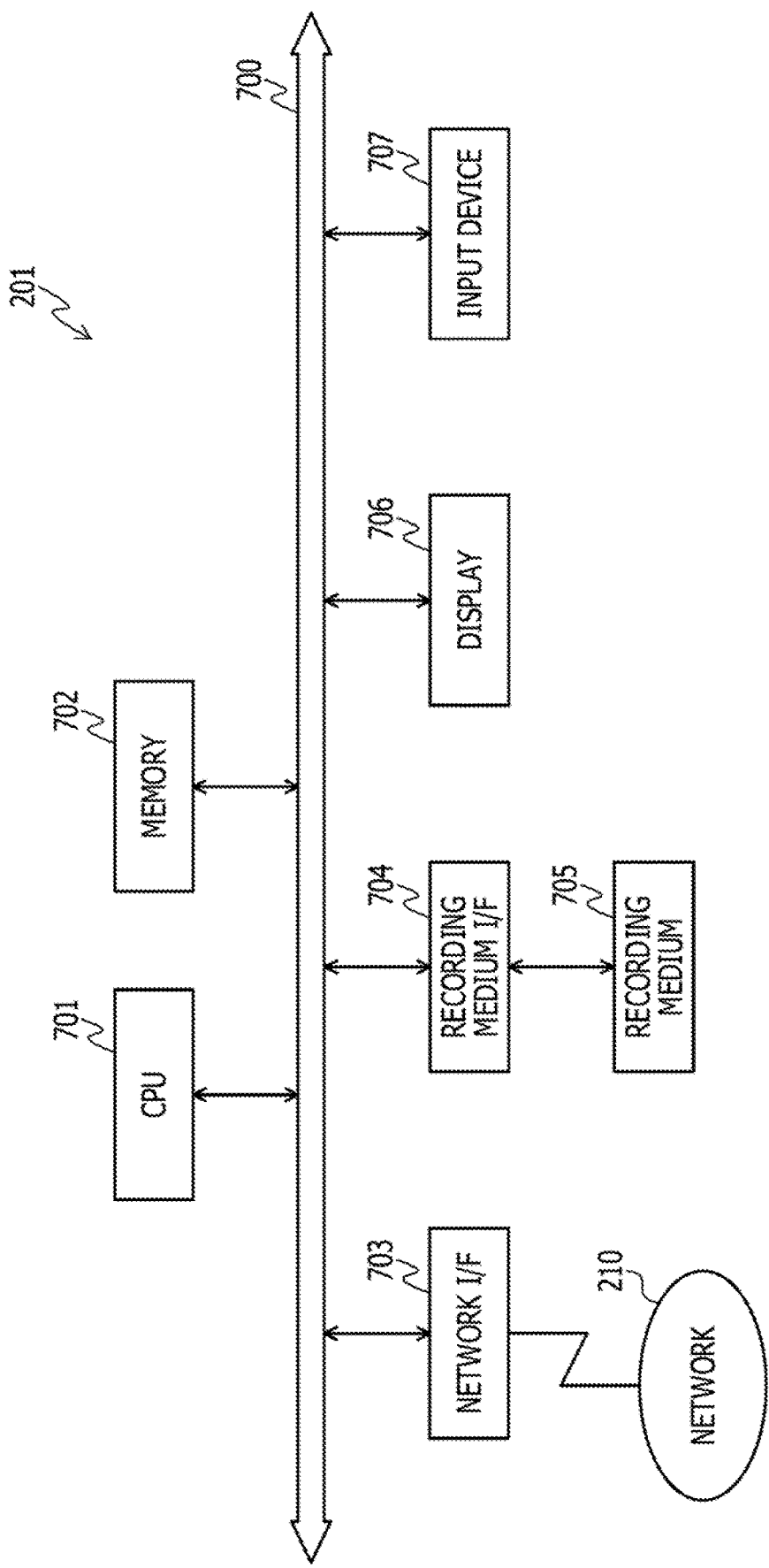
FIG. 7 is a block diagram illustrating an example of a hardware configuration of a terminal device.

FIG. 7 is a block diagram illustrating an example of a hardware configuration of a terminal device 201. In FIG. 7, the terminal device 201 includes a CPU 701, a memory 702, a network I/F 703, a recording medium I/F 704, a recording medium 705, a display 706, and an input device 707. In addition, each of the constituent units is coupled by a bus 700.

The CPU 701 is in charge of control of the whole of the terminal device 201. The memory 702 includes, for example, a ROM, a RAM, a flash ROM, and the like. For example, the flash ROM and the ROM store various kinds of programs, and the RAM is used as a work area of the CPU 701. A program stored in the memory 702 makes the CPU 701 perform coded processing by being loaded into the CPU 701.

The network I/F 703 is coupled to the network 210 through a communication line, and is coupled to another computer via the network 210. The network I/F 703 is in charge of an interface between the network 210 and the inside, and controls data input and output from the other computer. The network I/F 703 is, for example, a modem, a LAN adapter, or the like.

The recording medium I/F 704 controls the reading/writing of data to and from the recording medium 705 under control of the CPU 701. The recording medium I/F 704 is, for example, a disk drive, an SSD, a USB port, or the like. The recording medium 705 is a nonvolatile memory that stores data written by the control of the recording medium I/F 704. The recording medium 705 is, for example, a disk, a semiconductor memory, a USB memory, or the like. The recording medium 705 may be detachable from the terminal device 201.

The display 706 displays data such as documents, images, function information, or the like, including a cursor, an icon, or a tool box. The display 706 is, for example, a CRT, a liquid crystal display, an organic EL display, or the like. The input device 707 includes keys for input of characters, numbers, various kinds of instructions, and the like, and performs data input. The input device 707 may be a keyboard, a mouse, and the like, and may be a touch panel type input pad, numeric keys, or the like.

The terminal device 201 may include, for example, a printer, a scanner, a microphone, a speaker, or the like in addition to the above-described constituent units. In addition, the terminal device 201 may include a plurality of recording media I/F 704 and a plurality of recording media 705. In addition, the terminal device 201 may not include the recording medium I/F 704 and the recording medium 705.

(Example of Functional Configuration of Information Processing Device 100)

An example of a functional configuration of an information processing device will next be described with reference to FIG. 8.

Figure 8:
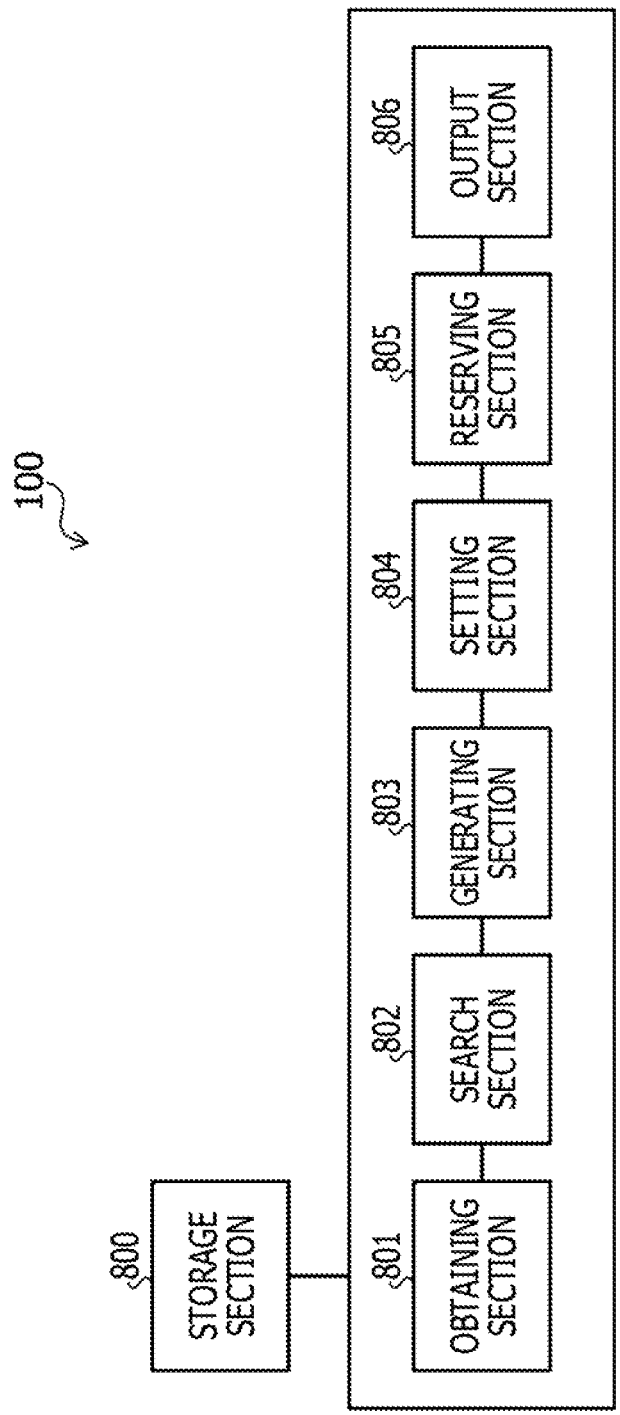
FIG. 8 is a block diagram illustrating an example of a functional configuration of an information processing device.

FIG. 8 is a block diagram illustrating an example of a functional configuration of an information processing device. The information processing device illustrated in FIG. 8 may be the information processing device 100 in FIG. 1. The information processing device 100 includes a storage section 800, an obtaining section 801, a search section 802, a generating section 803, a setting section 804, a reserving section 805, and an output section 806.

The storage section 800 is, for example, implemented by a storage area of the memory 302 or the recording medium 305 illustrated in FIG. 3 or the like. In the following, description will be made of a case where the storage section 800 is included in the information processing device 100. However, there is no limitation to the case. For example, there may be a case where the storage section 800 is included in a device different from the information processing device 100, and contents stored in the storage section 800 may be referred to from the information processing device 100.

The obtaining section 801 to the output section 806 function as an example of a control section. For example, the obtaining section 801 to the output section 806 implement the functions by making the CPU 301 execute a program stored in a storage area of the memory 302 or the recording medium 305 illustrated in FIG. 3 or the like or by the network I/F 303, for example. A result of processing of each functional section is, for example, stored in a storage area of the memory 302 or the recording medium 305 illustrated in FIG. 3 or the like.

The storage section 800 stores various kinds of information referred to or updated in processing of each functional section. The storage section 800 stores the names and attributes of users. The storage section 800 stores the names and characteristics of resources. The resources are places such as conference rooms, sports facilities, or the like, media such as books, music media, video media, or the like, or vehicles such as bicycles, automobiles, or the like. The storage section 800, for example, stores the names and characteristics of conference rooms. The characteristics of the conference rooms are, for example, vacant hours of the conference rooms, facilities of the conference rooms, locations of the conference rooms, and the like. For example, the storage section 800 stores the names and characteristics of the conference rooms by using the resource management DB 400 illustrated in FIG. 3.

The storage section 800 stores reservation information indicating reservation contents for resources, and manages reservation states. Each time the reserving section 805 sets a reservation for a resource, the storage section 800 stores reservation information indicating reservation contents for the resource. For example, each time the reserving section 805 sets a conference reservation for a conference room, the storage section 800 stores reservation information indicating conference reservation contents for the conference room by using the reservation management DB 500 illustrated in FIG. 5. The conference reservation contents are, for example, a holding time period of a conference, an organizer of the conference, participants in the conference, a title of the conference, the conference room for which the conference reservation is set, and the like.

The storage section 800 stores information about transitions of a condition for searching for a resource, the condition being specified from a user, in association with the user. The condition includes an item condition with regard to at least one of a plurality of items. The condition, for example, includes an item condition with regard to an item indicating a time for which a conference room is to be used, an item indicating facilities of the conference room, or an item indicating a place where the conference room is located. In a case where there are a plurality of users, the storage section 800 stores information about transitions of a condition for searching for resources in association with each of the plurality of users. In the following description, the information about the transitions of the condition for searching for resources may be described as "transition information."

The obtaining section 801 obtains various kinds of information used for processing of each functional section. The obtaining section 801 stores the obtained various kinds of information in the storage section 800, or outputs the obtained various kinds of information to each functional section. In addition, the obtaining section 801 may output various kinds of information stored in the storage section 800 to each functional section. The obtaining section 801, for example, obtains various kinds of information based on an operating input of the user. The obtaining section 801 may, for example, receive various kinds of information from a device different from the information processing device 100.

The obtaining section 801 receives a condition for specifying resources, the condition being specified from the user. The obtaining section 801 may receive an item condition of each of one or more items among a plurality of items as the condition for specifying resources. The obtaining section 801, for example, receives a condition for searching for resources, the condition being specified from the user, when the obtaining section 801 receives a reservation start request from the user. The reservation start request is a notification requesting a start of reservation work for searching for a resource for which to set a reservation, and setting a reservation for the resource. When each of one or more resources retrieved by the search section 802 under the received condition is already reserved, for example, the obtaining section 801 receives again a condition for searching for resources, the condition being specified from the user.

When none of the plurality of resources is retrieved by the search section 802 under the received condition, for example, the obtaining section 801 receives again a condition for searching for resources, the condition being specified from the user. When the obtaining section 801 receives a re-retrieval request from the user, for example, the obtaining section 801 receives a condition for searching for resources, the condition being specified from the user. The re-retrieval request is a notification requesting continuation of the reservation work and a re-retrieval for resources because the user does not set a reservation for any resources based on a result of search by the search section 802.

For example, the obtaining section 801 displays, on the terminal device 201 of the user, a screen controlling input and output of information in a format of interaction with the user. Then, for example, the obtaining section 801 receives a condition for searching for resources, the condition being specified from the user, from the terminal device 201 via the displayed screen. In addition, for example, when the obtaining section 801 receives a reservation start request or a re-retrieval request via the displayed screen, the obtaining section 801 receives a condition for searching for resources, the condition being specified from the user, from the terminal device 201 via the displayed screen. For example, the obtaining section 801 may receive the condition for searching for resources, the condition being specified from the user, by using the input device 306. In addition, for example, the obtaining section 801 may receive the reservation start request or the re-retrieval request and receive the condition for searching for resources, the condition being specified from the user, by using the input device 306.

The obtaining section 801 receives a setting request requesting the setting of a reservation by the user for a resource. The obtaining section 801, for example, receives a setting request requesting the setting of a reservation by the user for a resource selected by the user from one or more resources retrieved by the search section 802. For example, the obtaining section 801 displays a screen controlling input and output of information in a format of interaction with the user on the terminal device 201 of the user. Then, for example, the obtaining section 801 receives, from the terminal device 201, a setting request to set a reservation by the user for a retrieved resource via the displayed screen. For example, the obtaining section 801 may receive a setting request to set a reservation by the user for the retrieved resource by using the input device 306.

The obtaining section 801 receives a stop instruction. The stop instruction is a notification requesting stopping of reception of a condition for searching for resources and stopping the reservation work for searching for a resource for which to set a reservation and setting a reservation for the resource. For example, the obtaining section 801 displays, on the terminal device 201 of the user, a screen controlling input and output of information in a format of interaction with the user. Then, the obtaining section 801 receives the stop instruction via the displayed screen. When the obtaining section 801 receives the stop instruction, the obtaining section 801 stops reception of a condition for searching for resources, the condition being specified from the user.

Each time the search section 802 receives a condition for searching for resources, the condition being specified from the user, the search section 802 searches a plurality of resources for one or more resources matching the received condition. The search section 802, for example, refers to the resource management DB 400 illustrated in FIG. 4, and searches the plurality of resources for one or more resources matching the received condition. Thus, the search section 802 may be able to present, to the user, a resource that matches the condition specified from the user and for which a reservation is determined to be desired to be set by the user.

The generating section 803 generates transition information, and stores the transition information in the storage section 800. The transition information, for example, includes information in which conditions received in the past are arranged in time series order. The generating section 803, for example, generates the transition information based on conditions when the user does not set a reservation among the conditions received by the obtaining section 801 in the past, and stores the transition information in the storage section 800 in association with the user.

For example, when the user sets a reservation for a resource retrieved under a first condition, the generating section 803 generates the transition information based on conditions received before the first condition among received conditions. Then, for example, the generating section 803 stores the generated transition information in association with the user by using the reservation management DB 500 illustrated in FIG. 5. Thus, the generating section 803 may store the transition information reflecting an intention when the user intends to set a reservation.

For example, when the user sets a reservation for a resource retrieved under the first condition, the generating section 803 may generate the transition information based on the first condition and conditions received before the first condition among the received conditions. Then, For example, the generating section 803 stores the generated transition information in association with the user by using the reservation management DB 500 illustrated in FIG. 5. Thus, the generating section 803 may store the transition information reflecting an intention when the user intends to set a reservation, including the first condition.

For example, when the user does not set a reservation and reception of a condition for searching for resources is stopped, the generating section 803 generates the transition information based on conditions received before the stopping of the reception among the received conditions. Then, for example, the generating section 803 stores the generated transition information in association with the user by using the reservation stop DB 600 illustrated in FIG. 6. Thus, the generating section 803 may store the transition information reflecting an intention when the user intends to set a reservation even in the case where the reception of a condition for searching for resources is stopped.

For example, the generating section 803 generates the transition information based on conditions received before the first condition among conditions received during the display of a screen controlling input and output of information in a format of interaction with the user. Then, for example, the generating section 803 stores the generated transition information in the storage section 800 in association with the user.

For example, the generating section 803 generates the transition information based on conditions received before the stopping of reception of a condition for searching for resources among the conditions received during the display of the screen controlling input and output of information in a format of interaction with the user. Then, for example, the generating section 803 stores the generated transition information in the storage section 800 in association with the user.

For example, the generating section 803 generates the transition information based on conditions from the display of the screen controlling input and output of information in a format of interaction with the user to the reception of a setting request or a stop request among the received conditions. Then, for example, the generating section 803 stores the generated transition information in association with the user by using the reservation management DB 500 illustrated in FIG. 5 or the reservation stop DB 600 illustrated in FIG. 6. Thus, the generating section 803 may set a duration of the display of the screen as one piece of reservation work of the user, and generate the transition information in a unit of one piece of reservation work.

For example, the generating section 803 generates the transition information based on a difference between two consecutive conditions under which the user does not set a reservation among the conditions received in the past. The transition information is, for example, information about transitions of an item condition for each item and order in which item conditions are changed in the plurality of items. For example, the generating section 803 generates the transition information including information in which item conditions received in the past are arranged in time series order for each item and information in which the plurality of items are arranged in ascending order of timing in which item conditions are changed for the first time in the plurality of items. Then, for example, the generating section 803 stores the generated transition information in association with the user by using the reservation management DB 500 illustrated in FIG. 5 or the reservation stop DB 600 illustrated in FIG. 6. Thus, the generating section 803 may achieve a reduction in size of the transition information.

The generating section 803 stores a resource for which the user does not set a reservation in the storage section 800 in association with the user based on a condition when the resource for which the user may set a reservation is retrieved but the user does not set a reservation among the received conditions. For example, the generating section 803 stores the retrieved resource for which the user may set a reservation as an undesirable condition in association with the user in the reservation management DB 500 illustrated in FIG. 5 or the reservation stop DB 600 illustrated in FIG. 6. Thus, the generating section 803 may make it possible to identify the resource for which the user is determined not to desire to set a reservation.

When the user sets a reservation for a resource retrieved under the first condition, the generating section 803 may store the generated transition information and the set reservation by the user in the storage section 800 in association with the user. The generating section 803, for example, stores the generated transition information and the set reservation by the user in association with the user by using the reservation management DB 500 illustrated in FIG. 5. Thus, the generating section 803 may make it possible to identify the reservation by the user.

When a reservation for one resource of the plurality of resources is canceled, the setting section 804 sets one of a plurality of users as a target to which to output a notification that a reservation for the resource whose reservation is canceled may be set. In the following description, the target to which to output the notification that a reservation for the resource whose reservation is canceled can be set may be described as an "output target."

When a reservation for one resource of the plurality of resources is canceled, the setting section 804, for example, selects each user in order. Next, the setting section 804 determines whether or not the resource whose reservation is canceled matches a condition identified from the transition information stored in the storage section 800 in association with the selected user. Then, when the setting section 804 determines that the resource whose reservation is canceled matches, for example, the setting section 804 sets the selected user as the output target. On the other hand, when the setting section 804 determines that the resource whose reservation is canceled does not match, for example, the setting section 804 does not set the selected user as the output target.

For example, the setting section 804 determines whether or not a conference room whose reservation is canceled matches a condition identified from the transition information stored in the reservation management DB 500 illustrated in FIG. 5 or the reservation stop DB 600 illustrated in FIG. 6 and associated with the selected user. Then, for example, when the setting section 804 determines that the conference room whose reservation is canceled matches, the setting section 804 sets the selected user as the output target. When the setting section 804 determines that the conference room whose reservation is canceled does not match, on the other hand, for example, the setting section 804 does not set the selected user as the output target. Thus, for each user, when a reservation for a resource for which the user is determined to desire to set a reservation is canceled, the setting section 804 may set the user as the output target.

The setting section 804, for example, identifies, among the plurality of users, one or more users associated with transition information stored in the storage section 800, the transition information being able to identify a condition matching a resource whose reservation is canceled, and sets the one or more users as the output target. For example, the setting section 804 identifies one or more users associated with transition information stored in the reservation management DB 500 illustrated in FIG. 5 or the reservation stop DB 600 illustrated in FIG. 6, the transition information being able to identify a condition matching a conference room whose reservation is canceled, and sets the one or more users as the output target. Thus, the setting section 804 may identify one or more users determined to desire to set a new reservation for a resource whose reservation is canceled, and set the one or more users as the output target.

The setting section 804, for example, calculates an index value indicating a degree of compromise with regard to a condition identified from information stored in the storage section 800 in association with each of the identified one or more users and matching the resource whose reservation is canceled. The index value, for example, indicates a degree of compromise with reference to a condition used in a case where a resource that the user most desires to use is retrieved without any compromise. The reference condition is, for example, a condition specified by the user first. The index value, for example, indicates a degree of a priority with which the user desires to use the resource whose reservation is canceled. For example, the smaller the index value, the higher the degree of compromise of the user, and the higher the priority with which the user desires to use the resource whose reservation is canceled.

Then, the setting section 804, for example, sets one of the identified one or more users as the output target based on the calculated index value. For example, the setting section 804 sets a user whose calculated index value is smallest as the output target. Thus, the setting section 804 may calculate the index value indicating a degree of the priority with which the user desires to use the resource whose reservation is canceled. Then, when the reservation for the resource that the user is determined to desire to use with a relatively high priority is canceled, the setting section 804 may set the user as the output target.

The setting section 804 identifies a condition matching the resource whose reservation is canceled, the condition being identified from information stored in the storage section 800 in association with each user. The setting section 804 calculates the index value based on how early timing is in which timing an item condition is changed for the first time in an item related to the identified condition and which item condition in transition order in the item is included in the identified condition. The setting section 804, for example, calculates the index value such that the earlier the timing in which an item condition is changed for the first time in the item whose item condition is included in the identified condition, the smaller the index value. In addition, the setting section 804 calculates the index value such that the earlier the item condition included in the identified condition is received in reception order, the smaller the index value becomes. Thus, the setting section 804 may calculate the index value indicating a degree of the priority with which the user desires to use the resource whose reservation is canceled.

The setting section 804 calculates the index value based on which condition in specification order is the condition identified from information stored in the storage section 800 in association with each user and matching the resource whose reservation is canceled. For example, as the condition matching the resource whose reservation is canceled is specified earlier in specification order, the setting section 804 treats the condition as a condition with a higher priority with which the user desires to use the resource, and thus decreases the index value. Thus, the setting section 804 may calculate the index value indicating a degree of the priority with which the user desires to use the resource whose reservation is canceled.

The setting section 804, for example, sets the user as the output target when the resource whose reservation is canceled matches a condition identified from information stored in the storage section 800 in association with the user and is different from a resource stored in the storage section 800 in association with the user. Thus, the setting section 804 may not set the user as the output target when a reservation for a resource for which the user is determined not to desire to set a reservation is canceled.

The setting section 804 outputs a notification that a reservation for the resource whose reservation is canceled may be set to the user when the resource whose reservation by another user is canceled matches a condition identified from information stored in the storage section 800 in association with the user. Thus, the setting section 804 may not output a notification about a resource whose reservation is canceled by a user to the same user.

The setting section 804 calculates the index value indicating the degree of compromise of a condition identified from information stored in the storage section 800 in association with each of the identified one or more users and matching the resource whose reservation is canceled based on a number of times that the condition for searching for resources is changed. Thus, the setting section 804 may preferentially set, as the output target, a user who changed the condition for searching for resources a relatively large number of times and was able to reserve only a resource with a relatively low priority with which the user desires to use the resource.

When the reserving section 805 receives a setting request from the user, the reserving section 805 sets a reservation by the user for a resource retrieved by the search section 802, the resource being identified from the setting request. Thus, the reserving section 805 may set a reservation by the user for the resource for which the user desires to set a reservation.

When the reserving section 805 receives a reservation request as a result of outputting, to the user, a notification that a new reservation for a resource whose reservation is canceled may be set, the reserving section 805 sets a new reservation by the user for the resource whose reservation is canceled. Thus, the reserving section 805 may set a new reservation by the user for a resource desired to be used with a higher priority than a resource for which the user previously set a reservation.

When the reserving section 805 receives the reservation request, the reserving section 805 sets a new reservation by the user for the resource whose reservation is canceled, and cancels a reservation by the user, the reservation being stored in the storage section 800 in association with the user. Thus, the reserving section 805 may cancel the reservation previously set by the user when the reserving section 805 sets a new reservation by the user for the resource desired to be used with a higher priority than the resource for which the user previously set a reservation.

The output section 806 outputs a result of search by the search section 802. The output section 806, for example, transmits the result of the search by the search section 802 to the terminal device 201, and makes the result of the search by the search section 802 displayed via a screen controlling input and output of information in a format of interaction with the user. The output section 806 may output the result of the search by using the output device 307, for example. Thus, the output section 806 may make it possible for the user to grasp the result of the search.

The output section 806 outputs a notification that a new reservation may be set for the resource whose reservation is canceled to one of the one or more users set as the output target by the setting section 804. The output section 806, for example, transmits the notification that a new reservation may be set for the resource whose reservation is canceled to the terminal device 201. The output section 806 may, for example, output the notification that a new reservation may be set for the resource whose reservation is canceled by using the output device 307. Thus, the output section 806 may make it possible for the user to grasp that a new reservation may be set for the resource desired to be used with a higher priority than a resource for which the user previously set a reservation.

The output section 806 may output a processing result of one of the functional sections. An output form is, for example, display on a display, print output to a printer, transmission to an external device by the network I/F 303, or storage into a storage area of the memory 302, the recording medium 305, or the like. Thus, the output section 806 may be able to notify the processing result of each functional section to the user of the information processing device 100, and thereby improve the convenience of the information processing device 100.

First Operation Example of Information Processing Device 100

A first operation example of the information processing device 100 will next be described with reference to FIGS. 9 to 23. First, referring to FIG. 9 and FIG. 10, description will be made of an example in which the information processing device 100 receives a holding condition in the first operation example.

Figure 10:
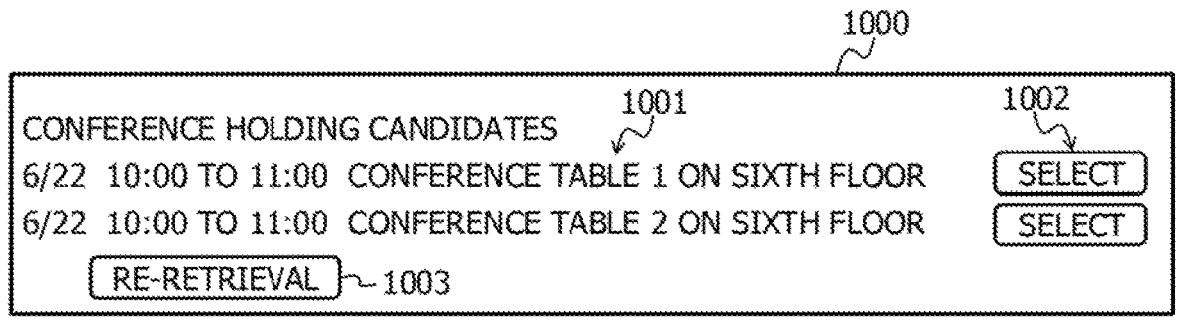
FIG. 10 is an explanatory diagram (2) illustrating an example of receiving a holding condition in a first operation example.

FIG. 9 and FIG. 10 are explanatory diagrams illustrating an example in which a holding condition is received in the first operation example. In FIG. 9, the information processing device 100 performs display control on the terminal device 201 to display an input screen 900 for inputting a holding condition on the terminal device 201. The holding condition, for example, includes one or more item conditions. The input screen 900, for example, includes a plurality of input boxes 901 to 906 and a search button 907.

The title of a conference is input in the input box 901. Participants in the conference are input in the input box 902. Item conditions related to a conference room in which to hold the conference are input in the input box 903. The item conditions related to the conference room are item conditions related to a place where the conference room is located and facilities of the conference room. An item condition related to a date is input as an item condition related to a holding time period of the conference in the input box 904. An item condition related to a time range is input as an item condition related to the holding time period of the conference in the input box 905. An item condition related to the time taken for the conference is input in the input box 906.

The user of the terminal device 201, for example, inputs the title of the conference, the item conditions related to the conference room, the item conditions related to the holding time period of the conference, the participants, and the like in the various input boxes 901 to 906, and clicks the search button 907. The information processing device 100, for example, receives the title of the conference, the item conditions related to the conference room, the item conditions related to the holding time period of the conference, the participants, and the like from the terminal device 201 in response to the clicking of the search button 907, and generates a holding condition. The information processing device 100 searches for conference rooms matching the generated holding condition. The description next proceeds to FIG. 10.

In FIG. 10, the information processing device 100 performs display control on the terminal device 201 to display a selecting screen 1000 presenting a search result 1001 on the terminal device 201. The search result 1001 is a list of retrieved conference rooms matching the holding condition. The selecting screen 1000, for example, includes the search result 1001, selecting buttons 1002 for selecting the conference rooms, and a re-retrieval button 1003.

The user of the terminal device 201 selects a conference room for which to set a reservation by using a selecting button 1002, and thereby transmits a reservation setting request for the selected conference room from the terminal device 201 to the information processing device 100. The information processing device 100 sets a reservation for the selected conference room in response to the setting request.

The user of the terminal device 201 may click the re-retrieval button 1003 without setting a reservation for the retrieved conference rooms. The information processing device 100 displays the input screen 900 again to receive a holding condition in response to the clicking of the re-retrieval button 1003. In addition, the information processing device 100 may display the input screen 900 again to receive a holding condition in a case where all of the retrieved conference rooms are already reserved or in a case where no conference room is retrieved. Thus, the information processing device 100 may search for conference rooms matching a holding condition each time the information processing device 100 receives a holding condition.

Next, referring to FIGS. 11 to 13, description will be made of another example in which the information processing device 100 receives a holding condition in the first operation example. FIGS. 11 to 13 are explanatory diagrams illustrating another example in which a holding condition is received in the first operation example.

In FIGS. 11 to 13, the information processing device 100 implements a chat bot that controls input and output of information in a format of interaction with the user, and receives a holding condition. In FIG. 11, the information processing device 100 performs display control on the terminal device 201 to display a browser screen 1100 implementing the chat bot.

The browser screen 1100, for example, includes a conversation display region 1110 that displays messages from the information processing device 100 and messages input by the user of the terminal device 201. The conversation display region 1110, for example, includes an input box 1111 in which the user of the terminal device 201 inputs a message and a transmission button 1112 that determines the input message and transmits the input message to the information processing device 100. The browser screen 1100 also includes a reservation display region 1120 that displays conference reservation contents set via the chat bot. The conference reservation contents in the reservation display region 1120 may be allowed to be corrected based on an operating input of the user on the terminal device 201.

In the example of FIG. 11, the information processing device 100 displays a message prompting for input of a holding condition in the conversation display region 1110, and waits for the input of the holding condition. The holding condition, for example, includes one or more item conditions. The one or more item conditions may not be input at a time, but may be input a plurality of divided times in a format of interaction with the user. The user of the terminal device 201, for example, inputs a message including a title of a conference, an item condition related to a holding time period of the conference, an organizer, participants, and the like to the input box 1111, and clicks the transmission button 1112. In response to the clicking of the transmission button 1112, the information processing device 100, for example, receives the message including the title of the conference, the item condition related to the holding time period of the conference, the organizer, the participants, and the like from the terminal device 201. The description next proceeds to FIG. 12.

In the example of FIG. 12, the information processing device 100 displays, in the conversation display region 1110, a message checking whether or not to correct the item condition related to the holding time period of the conference. The user of the terminal device 201 inputs "CORRECT" to the input box 1111, and clicks the transmission button 1112. The information processing device 100 receives "CORRECT" from the terminal device 201 in response to the clicking of the transmission button 1112. The information processing device 100 therefore displays a message prompting for correction of the holding time period of the conference in the conversation display region 1110. The user of the terminal device 201 inputs an item condition related to a holding time period of the conference to the input box 1111, and clicks the transmission button 1112. The information processing device 100 receives the item condition related to the holding time period of the conference from the terminal device 201 in response to the clicking of the transmission button 1112.

In addition, the information processing device 100 displays a message prompting for input of an item condition related to a holding place of the conference in the conversation display region 1110. The user of the terminal device 201 inputs an item condition related to a holding place of the conference to the input box 1111, and clicks the transmission button 1112. The information processing device 100 receives the item condition related to the holding place of the conference from the terminal device 201 in response to the clicking of the transmission button 1112. Thus, the information processing device 100 receives one or more item conditions as the holding condition of the conference from the terminal device 201 based on the operating input of the user on the terminal device 201. The description next proceeds to FIG. 13.

In the example of FIG. 13, the information processing device 100 searches for conference rooms matching the received various item conditions, displays a message including a result of the search in the conversation display region 1110, and waits for selection of a conference room for which to set a reservation or re-input of a holding condition. The user of the terminal device 201 selects a conference room for which to set a reservation, and transmits a reservation setting request for the selected conference room by a determination button or the input box 1111 from the terminal device 201 to the information processing device 100. The information processing device 100 sets a reservation for the conference room in response to the setting request.

The user of the terminal device 201 may not set a reservation for the retrieved conference rooms, but input a holding condition again by the input box 1111. In a case where the retrieved conference rooms are already reserved or in a case where no conference room is retrieved, the information processing device 100 may display a message prompting for re-input of a holding condition in the conversation display region 1110, and wait for the re-input of the holding condition. Thus, the information processing device 100 may search for conference rooms matching a holding condition each time the information processing device 100 receives a holding condition.

Next, referring to FIG. 14 and FIG. 15, description will be made of an example in which the information processing device 100 outputs a notification to the user after the information processing device 100 sets a reservation by the user for a conference room in the first operation example.

Figure 15:
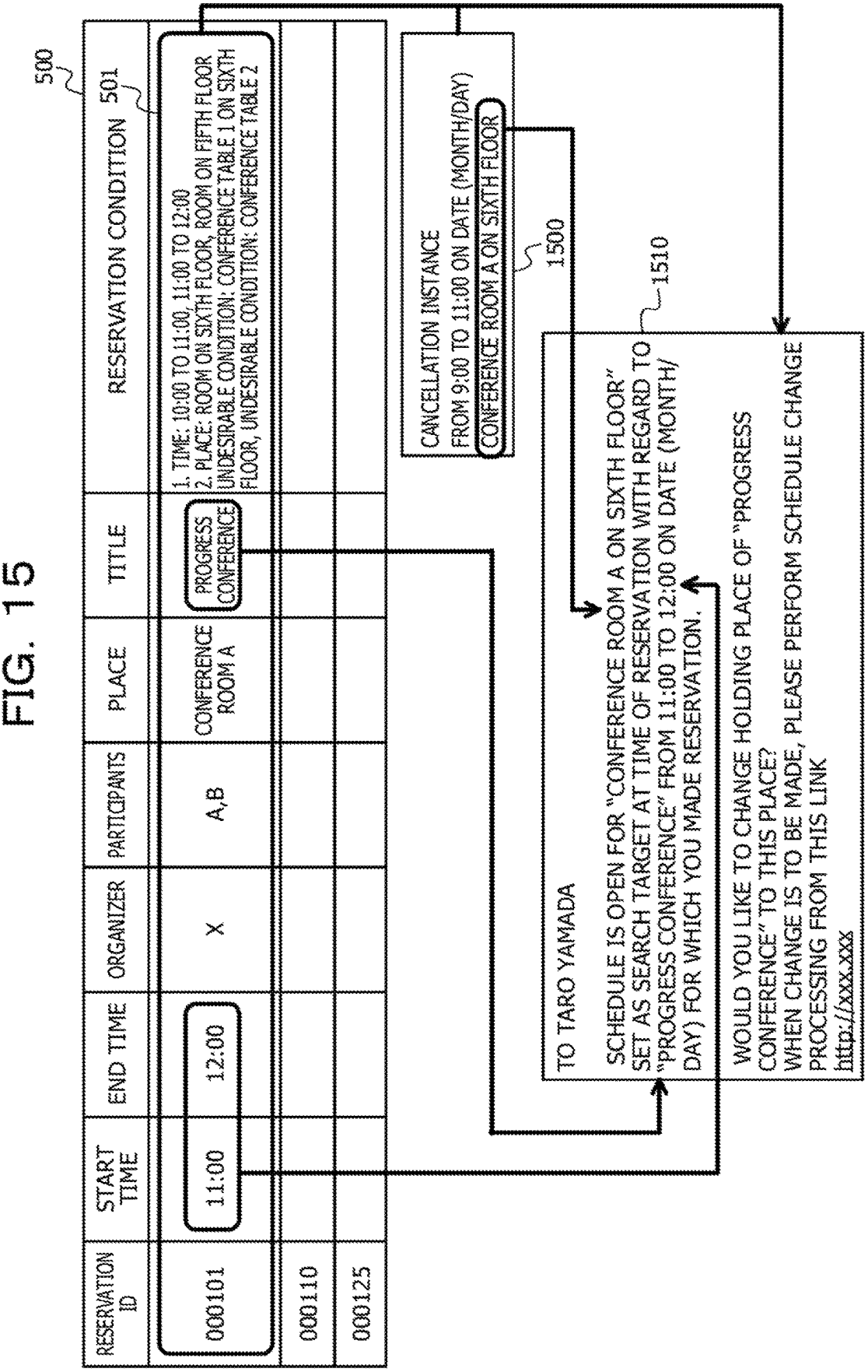
FIG. 15 is an explanatory diagram (2) illustrating an example of outputting a notification to a user after a reservation by the user is set in a first operation example.

FIG. 14 and FIG. 15 are explanatory diagrams illustrating an example of outputting a notification to the user after setting a reservation by the user in the first operation example. In FIG. 14, the information processing device 100 receives a reservation start request from the terminal device 201 based on an operating input of the user on the terminal device 201, and starts reservation work. The reservation work is, for example, implemented via the input screen 900 or the browser screen 1100 described above.

As indicated by an arrow 1401, the user transmits a holding condition for a first search from the terminal device 201 to the information processing device 100. The information processing device 100 receives the holding condition, stores the holding condition, and searches for conference rooms matching the holding condition. As indicated by an arrow 1402, the information processing device 100 transmits, to the terminal device 201, a notification that the number of retrieved conference rooms is zero as a result of the search, and thereby enables the notification to be referred to by the user. As indicated by an arrow 1403, the user transmits a holding condition for a second search from the terminal device 201 to the information processing device 100. The information processing device 100 receives the holding condition, stores the holding condition, and searches for conference rooms matching the holding condition. As indicated by an arrow 1404, the information processing device 100 transmits, to the terminal device 201, a notification that a result of the search is two items, a conference table 1 and a conference table 2, and thereby enables the notification to be referred to by the user.

Here, as indicated by an arrow 1405, the user rejects each of the conference table 1 and the conference table 2 without setting a conference reservation. Then, as indicated by an arrow 1406, the user transmits a holding condition for a third search from the terminal device 201 to the information processing device 100. The information processing device 100 receives the holding condition, and stores the holding condition. Here, because no conference reservation is set, and the information processing device 100 receives a new holding condition, the information processing device 100 stores the conference table 1 and the conference table 2 as undesirable conditions in the reservation management DB 500. An example of registering the undesirable conditions will be described later with reference to FIG. 18 and FIG. 19, for example. In addition, the information processing device 100 searches for conference rooms matching the holding condition, transmits a notification that a result of the search is one item, a conference room A, to the terminal device 201, as indicated by an arrow 1407, and thereby enables the notification to be referred to by the user.

As indicated by an arrow 1408, the user transmits a setting request to set a conference reservation for the conference room A from the terminal device 201 to the information processing device 100. When the information processing device 100 receives the setting request, the information processing device 100 sets a conference reservation for the conference room A and stores reservation contents in the reservation management DB 500, as indicated by an arrow 1409. In addition, because the conference reservation is set, the information processing device 100 generates transition information based on the stored holding conditions, and stores the transition information in the reservation management DB 500. Details of storing the transition information will be described later with reference to FIGS. 20 to 22, for example. The description next proceeds to FIG. 15.

In FIG. 15, the information processing device 100 detects that a "conference reservation for the conference room A on a sixth floor from 9:00 to 11:00 on a DATE (month/day)" is canceled, and stores the reservation contents as a cancellation instance 1500. The information processing device 100 determines whether or not the cancellation instance 1500 matches transition information stored in the reservation management DB 500.

The information processing device 100, for example, determines that the cancellation instance 1500 matches an item condition "10:00 to 11:00" related to a time and an item condition "room on the sixth floor" related to a place, the item conditions being indicated by the transition information of a record 501. Therefore, the information processing device 100 generates a message 1510 based on a title and a start time and an end time in the record 501 and the like, and transmits the message 1510 to the terminal device of the user identified from an organizer in the record 501. The message 1510 indicates that a new reservation by the user may be set for the "conference room A on the sixth floor," the conference reservation being canceled for the "conference room A on the sixth floor."

Thus, the information processing device 100 may output a notification that a reservation for the conference room is canceled and a new reservation may be set for the conference room to the user desiring to use the conference room whose conference reservation is canceled with a relatively high priority. Thus, the information processing device 100 may facilitate the setting of a reservation for the conference room desired to be used by the user with a high priority, and may therefore improve the convenience of the user. In addition, the information processing device 100 may narrow down users as the output target of the notification that a conference reservation for the conference room is canceled even when the user does not manually register the conference room desired to be used by the user with a high priority in advance, and may therefore suppress an increase in a work load on the user.

In addition, when the information processing device 100 sets a new reservation by the user to whom the notification is output for the conference room whose reservation is canceled, the information processing device 100 may refer to the reservation management DB 500, and identify and cancel a previously set conference reservation by the user to whom the notification is output. Therefore, the information processing device 100 may further output a notification of the conference room whose conference reservation is newly canceled to another user. As a result, the information processing device 100 may enable each user of the whole of the plurality of users to set a reservation for a resource desired to be used with a relatively high priority, and may enable the whole of the plurality of resources to be utilized effectively.

Next, referring to FIG. 16 and FIG. 17, description will be made of an example in which the information processing device 100 outputs a notification to the user after the information processing device 100 stops reservation by the user for a conference room in the first operation example.

FIG. 16 and FIG. 17 are explanatory diagrams illustrating an example of outputting a notification to the user after stopping reservation by the user in the first operation example. In FIG. 16, the information processing device 100 receives a reservation start request based on an operating input of the user on the terminal device 201 from the terminal device 201, and starts reservation work. The reservation work is, for example, implemented via the input screen 900 or the browser screen 1100 described above.

As indicated by an arrow 1601, the user transmits a holding condition for a first search from the terminal device 201 to the information processing device 100. The information processing device 100 receives the holding condition, stores the holding condition, and searches for conference rooms matching the holding condition. As indicated by an arrow 1602, the information processing device 100 transmits, to the terminal device 201, a notification that the number of retrieved conference rooms is zero as a result of the search, and thereby enables the notification to be referred to by the user. As indicated by an arrow 1603, the user transmits a holding condition for a second search from the terminal device 201 to the information processing device 100. The information processing device 100 receives the holding condition, stores the holding condition, and searches for conference rooms matching the holding condition. As indicated by an arrow 1604, the information processing device 100 transmits, to the terminal device 201, a notification that a result of the search is two items, a conference table 1 and a conference table 2, and thereby enables the notification to be referred to by the user.

Here, as indicated by an arrow 1605, the user rejects each of the conference table 1 and the conference table 2 without setting a conference reservation. Then, as indicated by an arrow 1606, the user transmits a holding condition for a third search from the terminal device 201 to the information processing device 100. The information processing device 100 receives the holding condition, and stores the holding condition. Here, because no conference reservation is set, and the information processing device 100 receives a new holding condition, the information processing device 100 stores the conference table 1 and the conference table 2 as undesirable conditions in the reservation management DB 500. An example of registering the undesirable conditions will be described later with reference to FIG. 18 and FIG. 19, for example. In addition, the information processing device 100 searches for conference rooms matching the holding condition, transmits a notification that the number of retrieved conference rooms is zero to the terminal device 201, as indicated by an arrow 1607, and thereby enables the notification to be referred to by the user.

The user gives up reserving a conference room, and transmits a reservation work stop request from the terminal device 201 to the information processing device 100, as indicated by an arrow 1608. When the information processing device 100 receives the stop request, the information processing device 100 generates transition information based on the stored holding conditions and stores the transition information in the reservation stop DB 600, as indicated by an arrow 1609. Details of storing the transition information will be described later with reference to FIGS. 20 to 22, for example. The information processing device 100 may copy the undesirable conditions stored in the reservation management DB 500 to the reservation stop DB 600. The description next proceeds to FIG. 17.

In FIG. 17, the information processing device 100 detects that a "conference reservation for the conference room A on the sixth floor from 9:00 to 11:00 on the DATE (month/day)" is canceled, and stores the reservation contents as a cancellation instance 1700. The information processing device 100 determines whether or not the cancellation instance 1700 matches transition information stored in the reservation stop DB 600.

The information processing device 100, for example, determines that the cancellation instance 1700 matches an item condition "10:00 to 11:00" related to a time and an item condition "room on the sixth floor" related to a place, the item conditions being indicated by the transition information of a record 601. Therefore, the information processing device 100 generates a message 1710 based on a title in the record 601 and the like, and transmits the message 1710 to the terminal device 201 of the user identified from an organizer in the record 601. The message 1710 indicates that a new reservation by the user may be set for the "conference room A on the sixth floor," the conference reservation being canceled for the "conference room A on the sixth floor."

Thus, the information processing device 100 may output a notification that a new reservation may be set for the conference room to the user who gave up a conference reservation in the past but desires to use the conference room whose conference reservation is canceled with a relatively high priority. Thus, the information processing device 100 may facilitate the setting of a reservation for the conference room desired to be used by the user with a high priority while suppressing an increase in a work load on the user, and may therefore improve the convenience of the user. In addition, the information processing device 100 may narrow down users as the output target of a notification that a conference reservation for the conference room is canceled even when the user does not manually register the conference room desired to be used by the user with a high priority in advance, and may therefore suppress an increase in a work load on the user.

Next, referring to FIG. 18 and FIG. 19, description will be made of an example in which undesirable conditions are registered in the first operation example.

Figure 19:
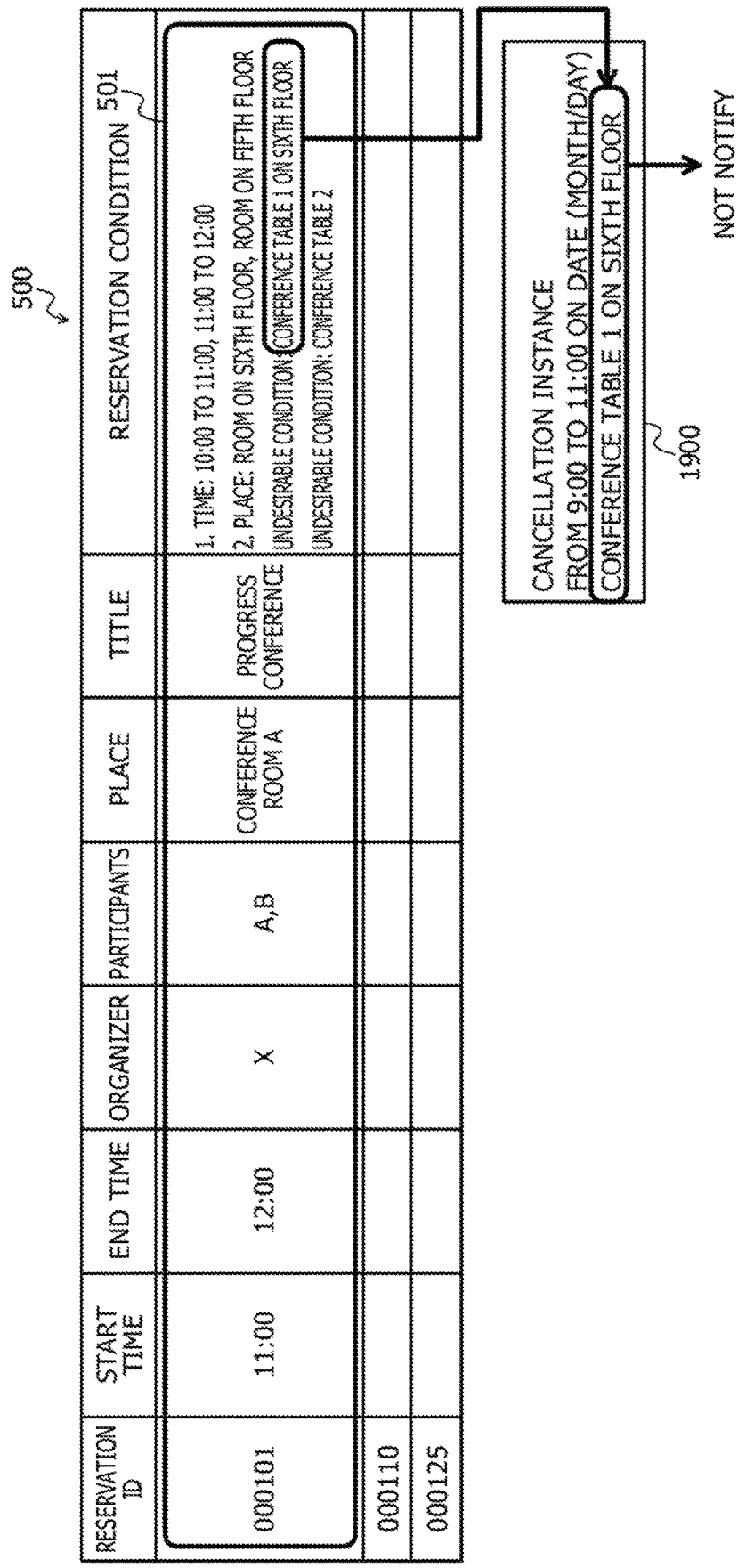
FIG. 19 is an explanatory diagram (2) illustrating an example of registering undesirable conditions in a first operation example.

FIG. 18 and FIG. 19 are explanatory diagrams illustrating an example of registering NG conditions in the first operation example. In the example of FIG. 18, similarly to FIG. 10, the information processing device 100 performs display control on the terminal device 201 to display a selecting screen 1000 indicating a search result 1001 on the terminal device 201. The search result 1001 indicates the conference table 1 on the sixth floor and the conference table 2 on the sixth floor as conference rooms for which no reservation is set yet and a new reservation may be set. Suppose that the user of the terminal device 201 does not set a reservation for the retrieved conference rooms, but clicks the re-retrieval button 1003.

In such a case, the information processing device 100 detects based on the clicking of the re-retrieval button 1003 that no reservation is set although reservations for the conference table 1 on the sixth floor and the conference table 2 on the sixth floor may be set. The fact that no reservation is set although the reservations may be set indicates that the user does not intend to set a reservation for the conference table 1 on the sixth floor nor the conference table 2 on the sixth floor. Hence, the information processing device 100 stores the "conference table 1 on the sixth floor" and the "conference table 2 on the sixth floor" as undesirable conditions in the reservation management DB 500.

The above description has been made of a case where the information processing device 100 stores the "conference table 1 on the sixth floor" and the "conference table 2 on the sixth floor" as undesirable conditions in the reservation management DB 500 without including information about holding time periods. However, there is no limitation to the case. For example, there may be a case where the information processing device 100 stores "6/22 10:00 to 11:00 Conference table 1 on the sixth floor" and "6/22 10:00 to 11:00 Conference table 2 on the sixth floor" as undesirable conditions. The description next proceeds to FIG. 19.

In FIG. 19, the information processing device 100 detects that a "conference reservation for the conference table 1 on the sixth floor from 9:00 to 11:00 on the DATE (month/day)" is canceled, and stores the reservation contents as a cancellation instance 1900. The information processing device 100 determines whether or not the cancellation instance 1900 matches transition information stored in the reservation management DB 500. In addition, the information processing device 100 determines whether or not the cancellation instance 1900 matches undesirable conditions stored in the reservation management DB 500.

Here, the information processing device 100, for example, determines that the cancellation instance 1900 matches an item condition "10:00 to 11:00" related to a time and an item condition "room on the sixth floor" related to a place, the item conditions being indicated by the transition information of a record 501. In addition, the information processing device 100, for example, determines that the cancellation instance 1900 matches the undesirable condition "conference table 1 on the sixth floor." Therefore, the information processing device 100 determines that the user does not intend to set a conference reservation for the "conference table 1 on the sixth floor" whose conference reservation is canceled. Therefore, the information processing device 100 does not generate a message for the user identified from an organizer in the record 501.

Thus, the information processing device 100 may not output a notification that a new reservation may be set for the conference room whose conference reservation is canceled to the user determined not to intend to use the conference room. Therefore, the information processing device 100 may preclude the user from receiving a notification of the conference room that the user does not intend to use, and consequently suppress an increase in a work load on the user and improve the convenience of the user.

The above description has been made of a case where the information processing device 100 outputs a notification to the user identified based on the record in the reservation management DB 500 or the reservation stop DB 600, the record having set therein the transition information matching the cancellation instance 1700. However, there is no limitation to the case. For example, there may be a case where when there are a plurality of identified users, the information processing device 100 further narrows down the identified users to a user as a target to which to output the notification. The description next proceeds to FIGS. 20 to 23 to describe the case where the information processing device 100 further narrows down the identified users to a user as a target to which to output the notification.

Figure 20:
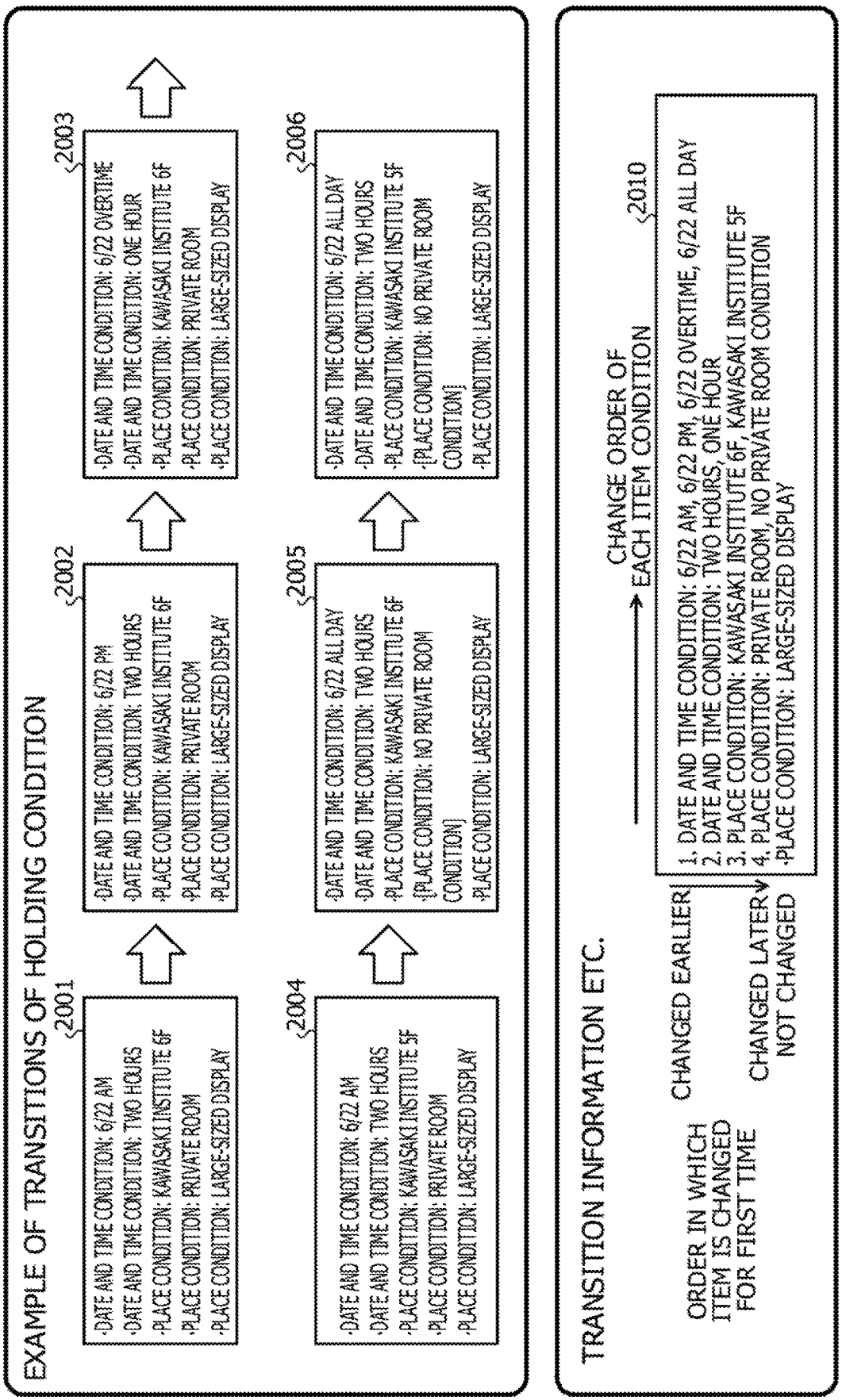
FIG. 20 is an explanatory diagram (1) illustrating details of storing information about transitions of a holding condition in a first operation example.

FIGS. 20 to 22 are explanatory diagrams illustrating details of storing information about transitions of a holding condition in the first operation example. Description will be made of a case where the information processing device 100 receives holding conditions 2001 to 2006 in order in FIGS. 20 to 22. In such a case, the information processing device 100 generates transition information 2010. The transition information 2010 includes information in which item conditions received in the past are arranged in time series order for each item and information in which a plurality of items are arranged in ascending order of timing in which item conditions are changed for the first time. The description next proceeds to FIG. 21 to describe a procedure of generating the transition information 2010.

In FIG. 21, based on a first holding condition 2001, the information processing device 100 registers item conditions included in the holding condition 2001 for each item as transition information 2101. The information processing device 100 updates the transition information 2101 to transition information 2102 based on a second holding condition 2002. The information processing device 100, for example, detects based on a difference between the first holding condition 2001 and the second holding condition 2002 that a first date and time condition is changed from "6/22 AM" to "6/22 PM." Therefore, the information processing device 100 adds "1," which indicates order in which the item condition is changed for the first time, to the head of a row of the first date and time condition, and sets "6/22 PM" in the rear of "6/22 AM" in the row of the first date and time condition. The information processing device 100 similarly updates the transition information 2102 to transition information 2103 based on a third holding condition 2003. The description next proceeds to FIG. 22.

In FIG. 22, the information processing device 100 similarly updates the transition information 2103 to transition information 2201 based on a fourth holding condition 2004. The information processing device 100 similarly updates the transition information 2201 to transition information 2202 based on a fifth holding condition 2005. The information processing device 100 similarly updates the transition information 2202 to transition information 2203 based on a sixth holding condition 2006. The information processing device 100 may thereby generate the transition information 2010. The description next proceeds to FIG. 23.

Figure 23:
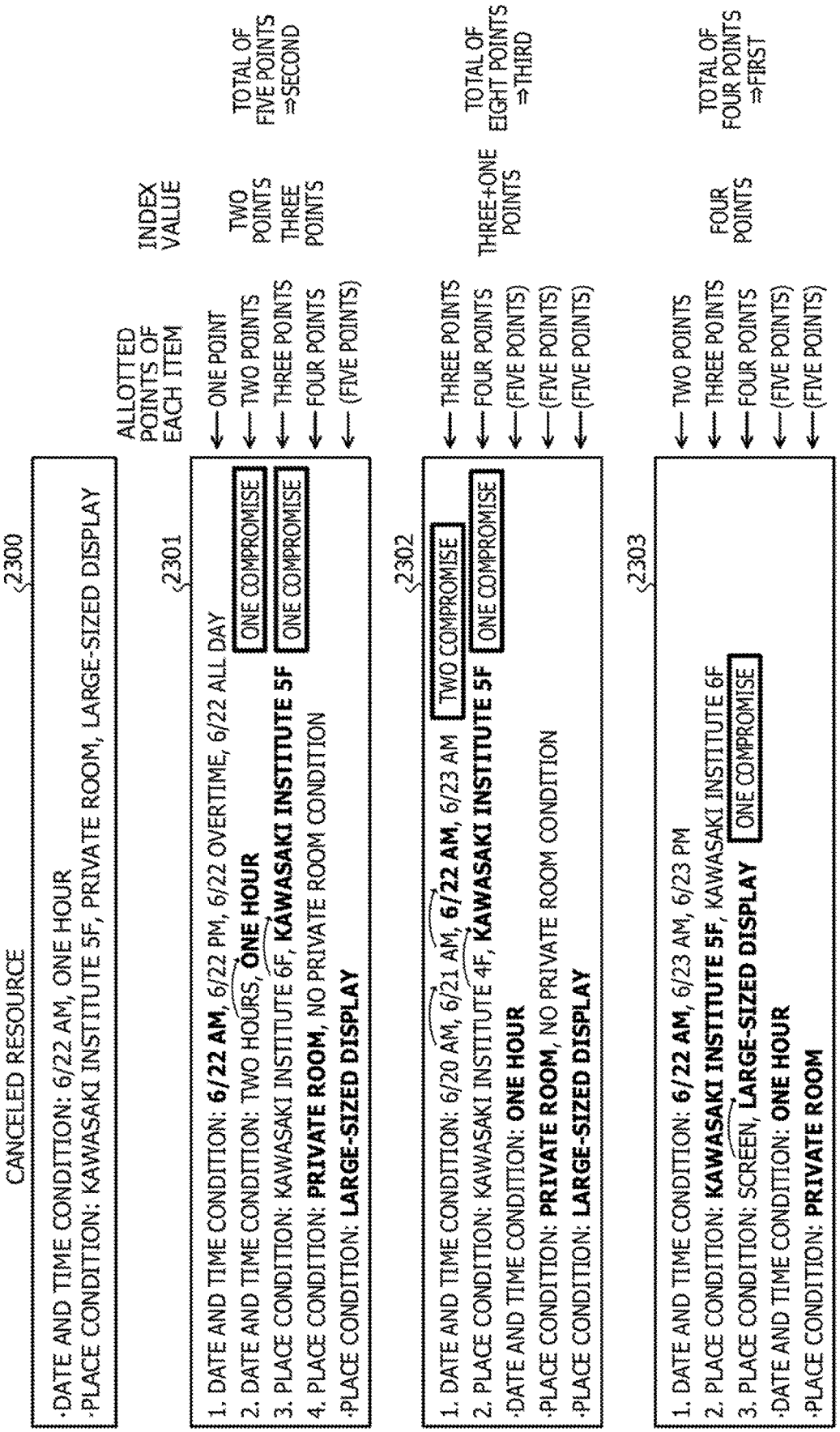
FIG. 23 is an explanatory diagram illustrating details of identifying a user as a target to which to output a notification in a first operation example.

FIG. 23 is an explanatory diagram illustrating details of identifying a user as a target to which to output a notification in the first operation example. In FIG. 23, the information processing device 100 detects cancellation of a conference reservation for a conference room matching conditions of "6/22 AM, one hour, Kawasaki Institute 5F, private room, large-sized display," and stores the reservation contents as a cancellation instance 2300. The information processing device 100 determines whether or not the cancellation instance 2300 matches transition information stored in the reservation management DB 500.

Here, suppose that the information processing device 100 determines that the cancellation instance 2300 matches transition information 2301 to 2303. In such a case, the information processing device 100 calculates index values based on the transition information 2301 to 2303. Then, the information processing device 100 identifies a user to whom a message is output based on the calculated index values.

The information processing device 100, for example, searches the transition information 2301 for item conditions matching the cancellation instance 2300. Then, the information processing device 100 calculates an index value based on how early timings are in which timings item conditions are changed for the first time in items that the retrieved item conditions are related to and which item conditions in specification order in the items are the retrieved item conditions. In the following description, the timings in which the item conditions are changed for the first time may be described as "first change timings."

For example, the information processing device 100 determines allotted points for each item of the transition information 2301 according to the first change timing. The information processing device 100 sets the allotted points of an item whose item condition is not changed at five points, and determines the allotted points of items whose item conditions are changed by decreasing the allotted points by one point in descending order of the first change timings with five points as a reference. In addition, the information processing device 100 searches the transition information 2301 for the item conditions "6/22 AM," "one hour," "Kawasaki Institute 5F," "private room," and "large-sized display."

The information processing device 100 identifies a retrieved item condition "6/22 AM" as an item condition related to an item whose first change timing is first, and identifies the retrieved item condition "6/22 AM" as an item condition specified first in an item unit. In a case of an item condition specified first in an item unit, the information processing device 100 determines that the item condition specified first in the item unit is an item condition that the user considers to be most desirable in the item unit, and is an item condition without compromise. Because the item condition specified first in the item unit is an item condition without compromise, the information processing device 100 does not add points to the index value irrespective of the allotted points set to the item.

The information processing device 100 identifies a retrieved item condition "one hour" as an item condition related to an item whose first change timing is second, and as an item condition specified second in an item unit. In a case of an item condition specified second in an item unit, the information processing device 100 determines that the item condition specified second in the item unit is an item condition as a result of one compromise from an item condition that the user considers to be most desirable in the item unit. Therefore, because the item condition specified second in the item unit is an item condition as a result of compromises, the information processing device 100 adds two allotted points set to the item to the index value. In addition, in a case of an item condition as a result of two compromises or more, the information processing device 100 may further add, to the index value, points obtained by subtracting one from the number of the compromises. Thus, the information processing device 100 calculates an index value of "five points" from the transition information 2301.

The information processing device 100 similarly calculates an index value of "eight points" from the transition information 2302. The information processing device 100 similarly calculates an index value of "four points" from the transition information 2303. Then, the information processing device 100 identifies a user corresponding to the transition information 2303 having the smallest index value as a user to whom to output a message.

Thus, the information processing device 100 may output a notification that a new reservation may be set for a conference room whose conference reservation is canceled to the user desiring to use the conference room with a relatively high priority. Thus, the information processing device 100 may facilitate the setting of a reservation for the conference room desired to be used by the user with a high priority while suppressing an increase in a work load on the user, and may therefore improve the convenience of the user.

In addition, the information processing device 100 may narrow down users as the output target of a notification that a conference reservation for the conference room is canceled even when the user does not manually register the conference room desired to be used by the user with a high priority in advance, and may therefore suppress an increase in a work load on the user.

Here, there may be a case where the information processing device 100 outputs a message to the user corresponding to the transition information 2303 having the smallest index value, but no reservation is set for the conference room related to the cancellation instance 2300. In such a case, the information processing device 100 may output the message to a user corresponding to the transition information 2301 having the second smallest index value. The information processing device 100 may thus output the message to the users corresponding to the transition information in increasing order of the index values.

The above description has been made of a case where the information processing device 100 uses the reservation management DB 500 and the reservation stop DB 600. However, there is no limitation to the case. For example, there may be a case where the information processing device 100 does not use the reservation management DB 500. In addition, for example, there may be a case where the information processing device 100 does not use the reservation stop DB 600.

In addition, description has been made of a case where the information processing device 100 calculates an index value based on transition information. However, there is no limitation to the case. For example, there may be a case where the information processing device 100 calculates the index value based on the transition information and the number of times that the user changes the holding condition. In such a case, for example, the information processing device 100 calculates the index value such that the larger the number of times that the user changes the holding condition, the smaller the index value.

The above description has been made of a case where the information processing device 100 generates transition information based on received holding conditions. However, there is no limitation to the case. For example, there may be a case where the information processing device 100 excludes holding conditions when conference rooms for which a conference reservation may be set are retrieved but no conference reservation is set among the received holding conditions, and generates the transition information.

Second Operation Example of Information Processing Device 100

A second operation example of the information processing device 100 will next be described with reference to FIGS. 24 to 27. The second operation example is an example in which the format of transition information is different from that of the first operation example.

First, referring to FIG. 24 and FIG. 25, description will be made of an example in which the information processing device 100 outputs a notification to a user after the information processing device 100 sets a reservation by the user for a conference room in the second operation example.

Figure 25:
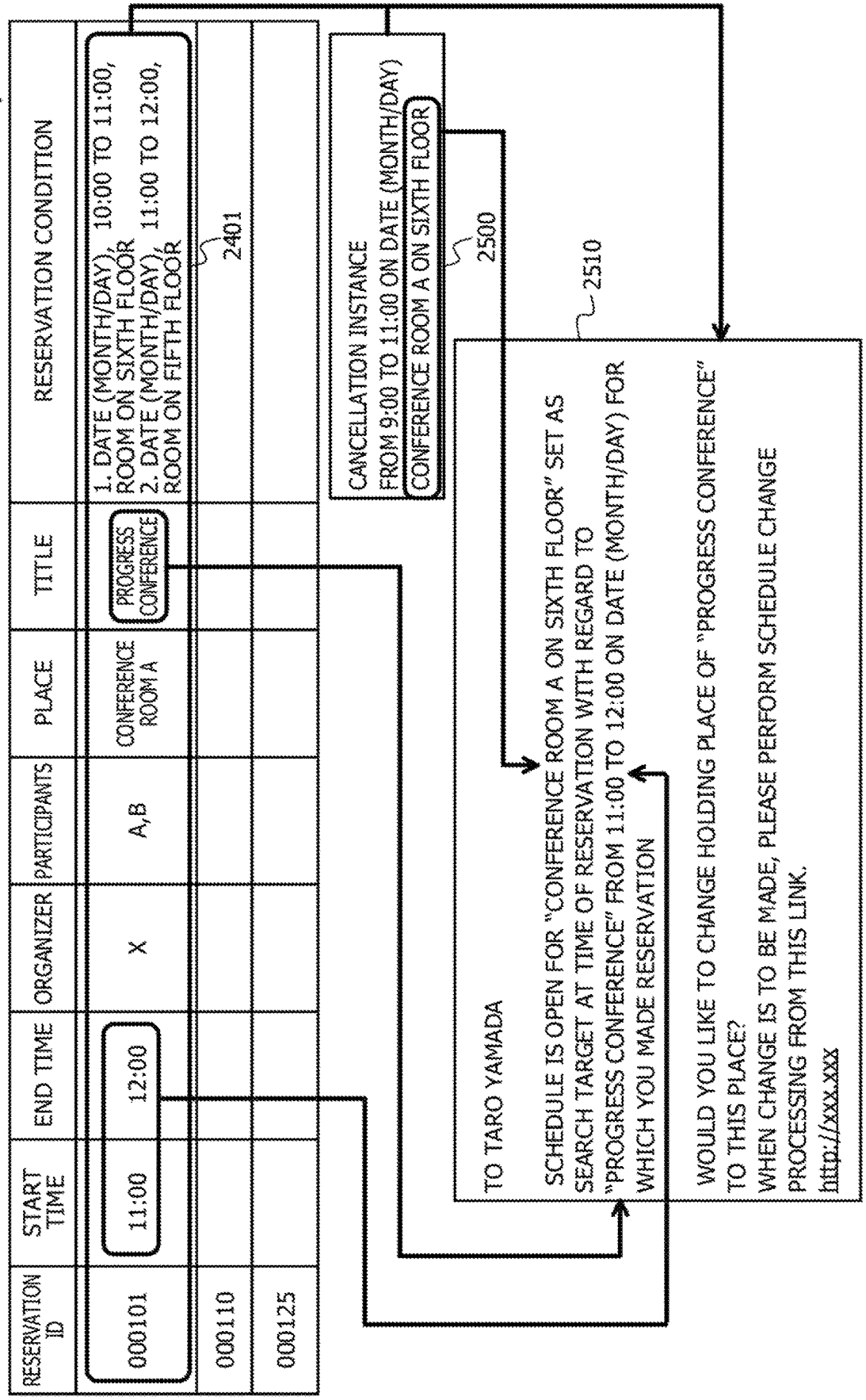
FIG. 25 is an explanatory diagram (2) illustrating an example of outputting a notification to a user after a reservation by the user is set in a second operation example.

FIG. 24 and FIG. 25 are explanatory diagrams illustrating an example of outputting a notification to a user after setting a reservation by the user in the second operation example. In FIG. 24, unlike the first operation example, when a reservation is set after the information processing device 100 receives a holding condition, the information processing device 100 generates transition information in which holding conditions received in the past are arranged in time series order, and stores the transition information in a reservation management DB 2400. The description next proceeds to FIG. 25.

In FIG. 25, the information processing device 100 detects that a "conference reservation for a conference room A on a sixth floor from 9:00 to 11:00 on a DATE (month/day)" is canceled, and stores the reservation contents as a cancellation instance 2500. The information processing device 100 determines whether or not the cancellation instance 2500 matches transition information stored in the reservation management DB 2400.

The information processing device 100, for example, determines that the cancellation instance 2500 matches a holding condition "10:00 to 11:00 on the DATE (month/day)" related to a time and an item condition "room on the sixth floor" related to a place, the item conditions being indicated by the transition information of a record 2401. Therefore, the information processing device 100 generates a message 2510 based on a title and a start time and an end time in the record 2401 and the like, and transmits the message 2510 to the terminal device 201 of the user identified from an organizer in the record 2401. The message 2510 indicates that a new reservation by the user may be set for the "conference room A on the sixth floor," the conference reservation being canceled for the "conference room A on the sixth floor."

Thus, the information processing device 100 may output a notification that a reservation for the conference room is canceled and a new reservation may be set for the conference room to the user desiring to use the conference room whose conference reservation is canceled with a relatively high priority. Thus, the information processing device 100 may facilitate the setting of a reservation for the conference room desired to be used by the user with a high priority, and may therefore improve the convenience of the user. In addition, the information processing device 100 may narrow down users as the output target of the notification that a conference reservation for the conference room is canceled even when the user does not manually register the conference room desired to be used by the user with a high priority in advance, and may therefore suppress an increase in a work load on the user.

In addition, when the information processing device 100 sets a new reservation by the user to whom the notification is output for the conference room whose reservation is canceled, the information processing device 100 may refer to the reservation management DB 2400, and identify and cancel a previously set conference reservation by the user to whom the notification is output. Therefore, the information processing device 100 may further output a notification of the conference room whose conference reservation is newly canceled to another user. As a result, the information processing device 100 may enable each user of the whole of the plurality of users to set a reservation for a resource desired to be used with a relatively high priority, and may enable the whole of the plurality of resources to be utilized effectively.

The above description has been made of a case where when a reservation is set after the information processing device 100 receives a holding condition, the information processing device 100 generates transition information, and stores the transition information in the reservation management DB 2400. However, there is no limitation to the case. For example, when reservation is stopped after the information processing device 100 receives a holding condition, the information processing device 100 may similarly transmit a message to the terminal device 201 in a case where the information processing device 100 generates transition information in which holding conditions received in the past are arranged in time series order, and stores the transition information in the reservation stop DB 600. The description next proceeds to FIG. 26 and FIG. 27 to describe a case where the information processing device 100 further narrows down identified users to a user to whom to output a notification.

FIG. 26 is an explanatory diagram illustrating details of storing information about transitions of a holding condition in the second operation example. Description will be made of a case where the information processing device 100 receives holding conditions 2601 to 2606 in order in FIG. 26. In such a case, the information processing device 100 generates transition information 2610. The transition information 2610 is information in which holding conditions received in the past are arranged in time series order. The description next proceeds to FIG. 27.

FIG. 27 is an explanatory diagram illustrating details of identifying a user as a target to which to output a notification in the second operation example. In FIG. 27, the information processing device 100 detects cancellation of a conference reservation for a conference room matching conditions of "6/22 AM, one hour, Kawasaki Institute 5F, private room, large-sized display," and stores the reservation contents as a cancellation instance 2700. The information processing device 100 determines whether or not the cancellation instance 2700 matches transition information stored in the reservation management DB 500.

Suppose that the information processing device 100 determines that the cancellation instance 2700 matches transition information 2701 to 2703. "One hour" in the cancellation instance 2700 is included in an item condition "two hours," and is therefore determined to match the item condition "two hours." In such a case, the information processing device 100 calculates index values based on the transition information 2701 to 2703. Then, the information processing device 100 identifies a user to whom a message is output based on the calculated index values.

The information processing device 100, for example, searches the transition information 2701 for a holding condition matching the cancellation instance 2700. Then, the information processing device 100 calculates an index value based on which holding condition in specification order is the retrieved holding condition. For example, because the retrieved holding condition is a holding condition specified fourth, the information processing device 100 calculates that the index value for the transition information 2701 is "four points," which is the same as the number of the holding condition.

The information processing device 100 similarly calculates an index value of "one point" from the transition information 2702. The information processing device 100 similarly calculates an index value of "three points" from the transition information 2703. Then, the information processing device 100 identifies a user corresponding to the transition information 2702 having the smallest index value as a user to whom a message is output.

Thus, the information processing device 100 may output a notification that a new reservation may be set for the conference room whose conference reservation is canceled to the user desiring to use the conference room with a relatively high priority. Thus, the information processing device 100 may facilitate the setting of a reservation for the conference room desired to be used by the user with a high priority while suppressing an increase in a work load on the user, and may therefore improve the convenience of the user. In addition, the information processing device 100 may narrow down users as the output target of a notification that a conference reservation for the conference room is canceled even when the user does not manually register the conference room desired to be used by the user with a high priority in advance, and may therefore suppress an increase in a work load on the user.

Here, there may be a case where the information processing device 100 outputs a message to the user corresponding to the transition information 2702 having the smallest index value, but no reservation is set for the conference room related to the cancellation instance 2700. In such a case, the information processing device 100 may output the message to a user corresponding to the transition information 2703 having the second smallest index value. The information processing device 100 may thus output the message to the users corresponding to the transition information in increasing order of the index values.

The above description has been made of a case where the information processing device 100 uses the reservation management DB 500 and the reservation stop DB 600. However, there is no limitation to the case. For example, there may be a case where the information processing device 100 does not use the reservation management DB 500. In addition, for example, there may be a case where the information processing device 100 does not use the reservation stop DB 600.

In addition, description has been made of a case where the information processing device 100 calculates an index value based on transition information. However, there is no limitation to the case. For example, there may be a case where the information processing device 100 calculates the index value based on the transition information and the number of times that the user changes the holding condition. In such a case, the information processing device 100 calculates the index value such that the larger the number of times that the user changes the holding condition, the smaller the index value.

(Registration Processing Procedure)

Next, referring to FIG. 28, description will be made of an example of a registration processing procedure performed by the information processing device 100. Registration processing is, for example, implemented by the CPU 301 illustrated in FIG. 3, a storage area of the memory 302, the recording medium 305, or the like, and the network I/F 303.

Figure 28:
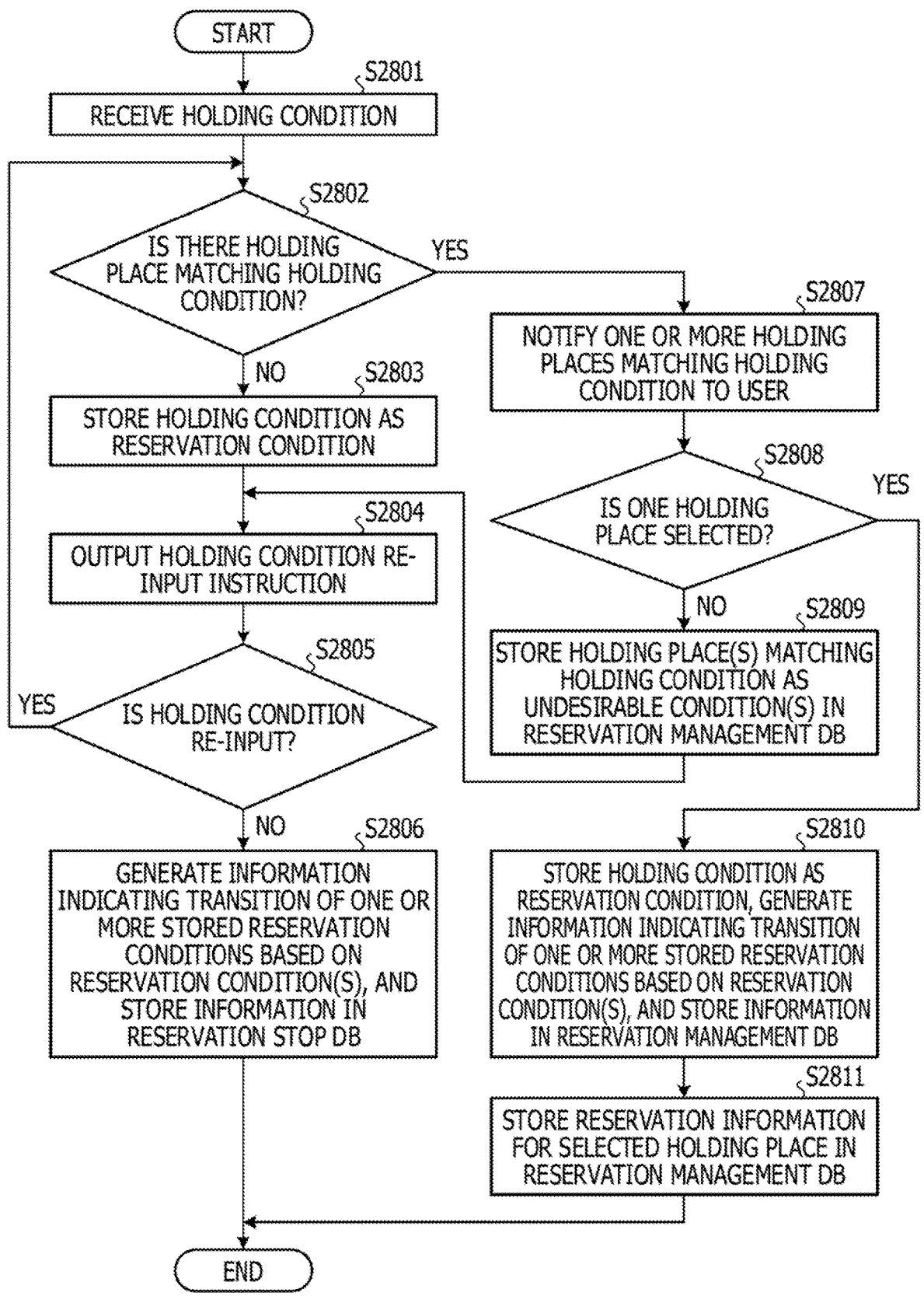
FIG. 28 is a flowchart illustrating an example of a registration processing procedure.

FIG. 28 is a flowchart illustrating an example of the registration processing procedure. In FIG. 28, the information processing device 100 receives an input holding condition (step S2801). The information processing device 100 then proceeds to the processing of step S2802.

In step S2802, the information processing device 100 determines whether or not there is a holding place matching the received holding condition (step S2802). When there is a holding place matching the holding condition (step S2802: Yes), the information processing device 100 proceeds to the processing of step S2807. When there is no holding place matching the holding condition (step S2802: No), on the other hand, the information processing device 100 proceeds to the processing of step S2803.

In step S2803, the information processing device 100 stores the received holding condition as a reservation condition (step S2803). The information processing device 100 then proceeds to the processing of step S2804.

In step S2804, the information processing device 100 outputs an instruction for re-input of a holding condition (step S2804). Then, the information processing device 100 determines whether or not a holding condition is re-input (step S2805). When a holding condition is re-input (step S2805: Yes), the information processing device 100 returns to the processing of step S2802. When no holding condition is re-input (step S2805: No), on the other hand, the information processing device 100 proceeds to the processing of step S2806.

In step S2806, based on one or more stored reservation conditions, the information processing device 100 generates information indicating transition of the reservation condition(s), and stores the information in the reservation stop DB 600 (step S2806). The information processing device 100 then ends the registration processing.

In step S2807, the information processing device 100 notifies the user of one or more holding places matching the received holding condition (step S2807). Then, the information processing device 100 determines whether or not one holding place matching the received holding condition is selected as a reservation destination (step S2808). When a holding place is selected (step S2808: Yes), the information processing device 100 proceeds to the processing of step S2810. When no holding place is selected (step S2808: No), on the other hand, the information processing device 100 proceeds to the processing of step S2809.

In step S2809, the information processing device 100 stores the holding place(s) matching the received holding condition as undesirable condition(s) in the reservation management DB 500 (step S2809). The information processing device 100 then proceeds to the processing of step S2804.

In step S2810, the information processing device 100 stores the received holding condition as a reservation condition, generates information indicating transition of the one or more stored reservation conditions based on the reservation condition(s), and stores the information in the reservation management DB 500 (step S2810).

Next, the information processing device 100 stores reservation information for the holding place selected as the reservation destination in the reservation management DB 500 (step S2811). The information processing device 100 then ends the registration processing.

(Recommending Processing Procedure)

Next, referring to FIG. 29 and FIG. 30, description will be made of an example of a recommending processing procedure performed by the information processing device 100. Recommending processing is, for example, implemented by the CPU 301 illustrated in FIG. 3, a storage area of the memory 302, the recording medium 305, or the like, and the network I/F 303.

Figure 29:
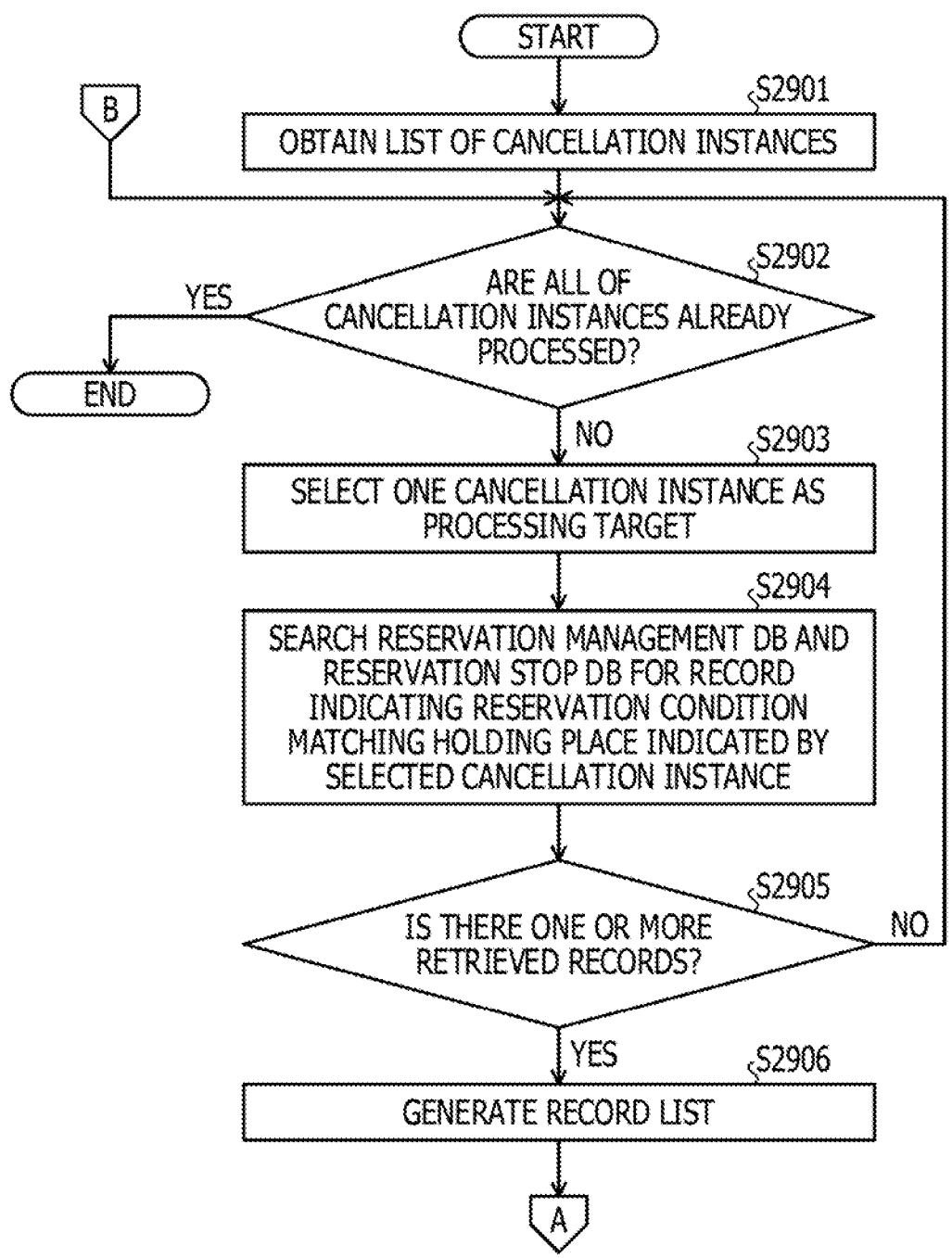
FIG. 29 is a flowchart (1) illustrating an example of a recommending processing procedure.
Figure 30:
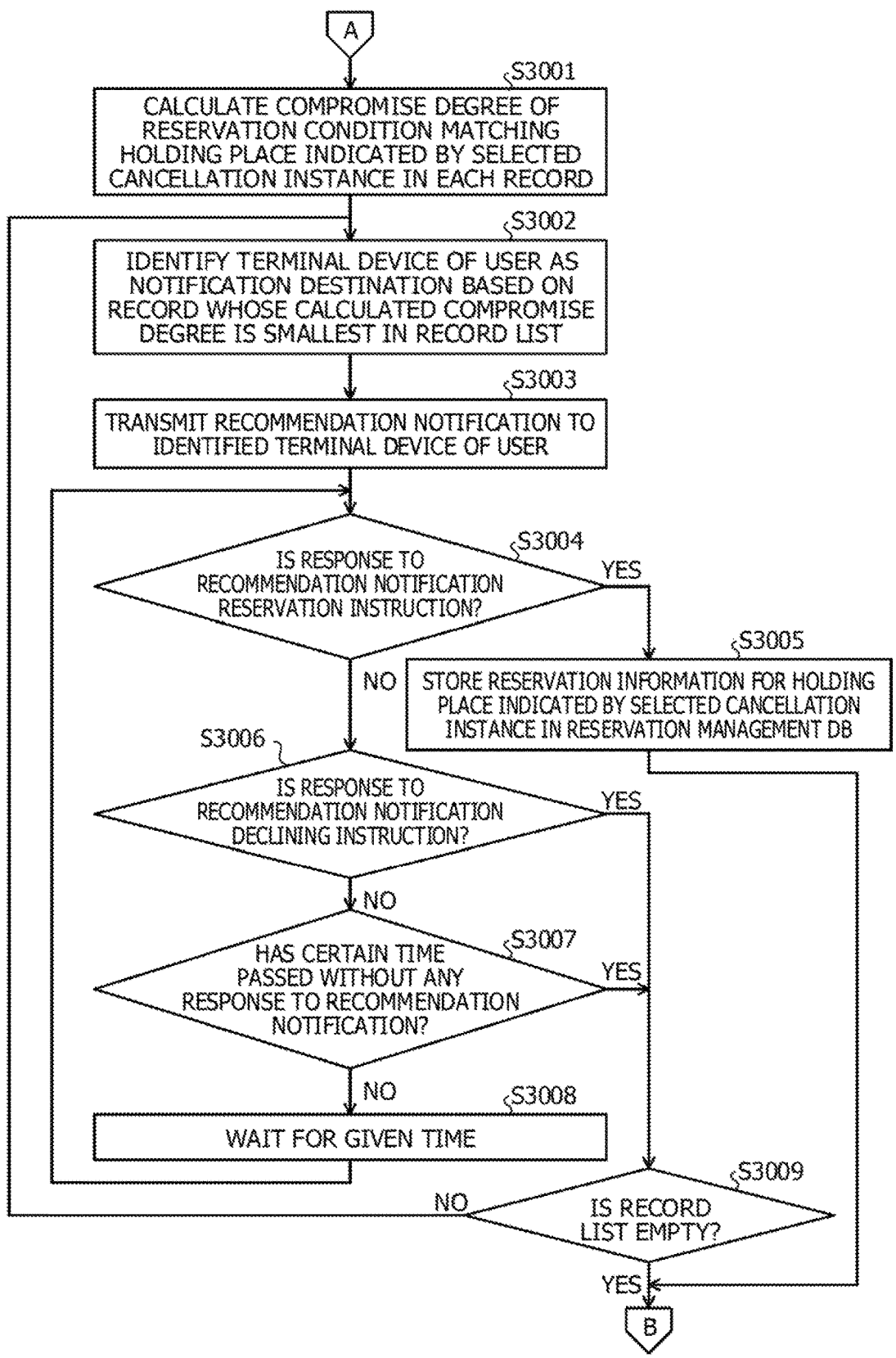
FIG. 30 is a flowchart (2) illustrating an example of a recommending processing procedure.

FIG. 29 and FIG. 30 are a flowchart illustrating an example of the recommending processing procedure. In FIG. 29, the information processing device 100 obtains a list of cancellation instances (step S2901). The information processing device 100 then proceeds to the processing of step S2902.

In step S2902, the information processing device 100 determines whether or not all of the cancellation instances in the list of the cancellation instances are already processed (step S2902). When all of the cancellation instances are already processed (step S2902: Yes), the information processing device 100 ends the recommending processing. When there is an unprocessed cancellation instance (step S2902: No), on the other hand, the information processing device 100 proceeds to the processing of step S2903.

In step S2903, the information processing device 100 selects one cancellation instance in the list of the cancellation instances as a processing target (step S2903). Next, the information processing device 100 searches the reservation management DB 500 and the reservation stop DB 600 for a record indicating a reservation condition matching a holding place indicated by the cancellation instance selected as the processing target (step S2904).

Then, the information processing device 100 determines whether or not there is one or more retrieved records (step S2905). When there is no retrieved record (step S2905: No), the information processing device 100 returns to the processing of step S2902. When there is one or more retrieved records (step S2905: Yes), on the other hand, the information processing device 100 proceeds to the processing of step S2906.

In step S2906, the information processing device 100 generates a record list including the retrieved record(s) (step S2906). The information processing device 100 then proceeds to the processing of step S3001 in FIG. 30.

In FIG. 30, the information processing device 100 calculates a compromise degree of the reservation condition matching the holding place indicated by the cancellation instance selected as the processing target in each record with reference to a first reservation condition based on the record list (step S3001). The information processing device 100 then proceeds to the processing of step S3002.

In step S3002, the information processing device 100 identifies the terminal device 201 of a user as a notification destination based on a record whose calculated compromise degree is smallest in the record list (step S3002). Next, the information processing device 100 transmits a recommendation notification indicating that a reservation for the holding place indicated by the cancellation instance selected as the processing target is possible to the identified terminal device 201 of the user (step S3003).

Then, the information processing device 100 determines whether or not a response to the recommendation notification is a reservation instruction (step S3004). When the response to the recommendation notification is a reservation instruction (step S3004: Yes), the information processing device 100 proceeds to the processing of step S3005. When the response to the recommendation notification is not a reservation instruction (step S3004: No), on the other hand, the information processing device 100 proceeds to the processing of step S3006.

In step S3005, the information processing device 100 stores reservation information for the holding place indicated by the cancellation instance selected as the processing target in the reservation management DB 500 (step S3005). The information processing device 100 then returns to the processing of step S2902 in FIG. 29.

In step S3006, the information processing device 100 determines whether or not the response to the recommendation notification is a declining instruction (step S3006). When the response to the recommendation notification is a declining instruction (step S3006: Yes), the information processing device 100 proceeds to the processing of step S3009. When the response to the recommendation notification is not a declining instruction (step S3006: No), on the other hand, the information processing device 100 proceeds to the processing of step S3007.

In step S3007, the information processing device 100 determines whether or not a certain time has passed without any response to the recommendation notification (step S3007). When the certain time has passed (step S3007: Yes), the information processing device 100 proceeds to the processing of step S3009. When the certain time has not passed (step S3007: No), on the other hand, the information processing device 100 waits for a predetermined time (step S3008), and then returns to the processing of step S3004.

In step S3009, the information processing device 100 determines whether or not the record list is empty (step S3009). When the record list is not empty (step S3009: No), the information processing device 100 returns to the processing of step S3002. When the record list is empty (step S3009: Yes), on the other hand, the information processing device 100 returns to the processing of step S2902 in FIG. 29.

As described above, each time a condition for searching for a resource, the condition being specified from a user, is received, the information processing device 100 may search for a resource matching the received condition among a plurality of resources. The information processing device 100 may store transition information in a storage unit in association with the user based on a condition when a reservation by the user is not set among the received conditions. When a reservation for one resource of the plurality of resources is canceled, the information processing device 100 may determine whether or not the one resource matches a condition identified from the information stored in the storage unit in association with the user. When the one resource matches the condition identified from the information stored in the storage unit in association with the user, the information processing device 100 may output a notification that a reservation for the one resource may be set to the user. Thus, the information processing device 100 may output a notification that a reservation for the resource is canceled and that a new reservation may be set for the resource to the user desiring to use the resource whose reservation is canceled with a relatively high priority.

When a reservation by the user for a resource retrieved under a first condition is set, the information processing device 100 may generate the transition information based on a condition received before the first condition among the received conditions. Thus, the information processing device 100 may set conditions received before the first condition as conditions used to generate the transition information, and may therefore generate the transition information easily in one unit of reservation work.

When the reservation by the user for the resource retrieved under the first condition is set, the information processing device 100 may generate the transition information based on the first condition and the condition received before the first condition among the received conditions. Thus, the information processing device 100 may set the first condition and conditions received before the first condition as conditions used to generate the transition information, and may therefore generate the transition information easily in one unit of reservation work. In addition, because the information processing device 100 uses the first condition to generate the transition information, the information processing device 100 may deal with, for example, a case where a resource of a first choice among resources retrieved under the first condition is given up, and a reservation for a resource of a second choice is set.

When reception of a condition for searching for a resource is stopped, the information processing device 100 may generate the transition information based on a condition received before the stopping of the reception among the received conditions. Thus, the information processing device 100 may set conditions received before the stopping of the reception as conditions used to generate the transition information, and may therefore generate the transition information easily in one unit of reservation work. In addition, the information processing device 100 may output a notification also to a user who did not set a reservation and gave up reservation.

The information processing device 100 may identify one or more users associated with information stored in the storage unit, the information being able to identify a condition matching one resource, among a plurality of users. The information processing device 100 may output a notification that a reservation for the one resource can be set to one of the identified one or more users. Thus, the information processing device 100 may narrow down users desiring to use the resource whose reservation is canceled with a relatively high priority to a user as an output target.

The information processing device 100 may calculate an index value indicating a degree of compromise of a condition matching the one resource, the condition identified from information stored in the storage unit in association with each of the identified one or more users. The information processing device 100 may output a notification that a reservation for the one resource can be set to one of the identified one or more users based on the calculated index value. Thus, the information processing device 100 may narrow down users as output targets in consideration of a priority with which the user desires to use the resource whose reservation is canceled and in consideration of an intention of the user, based on the index value.

The information processing device 100 may store information about transition of item conditions for each item and order in which a plurality of items are arranged in ascending order of timing in which the item conditions are changed for the first time in the storage unit in association with the user. The information processing device 100 may calculate the index value based on how early timing is in which timing an item condition is changed for the first time in an item related to the condition matching the one resource and which item condition in transition order is included in the condition matching the one resource. Thus, the information processing device 100 may identify a resource that does not match a condition itself received in the past but matches a combination of item conditions included in conditions received in the past, and is thus determined to be desired to be used by the user with a relatively high priority. Therefore, the information processing device 100 may achieve an improvement in a probability of outputting a notification to the user when a reservation for the resource determined to be desired to be used by the user with a relatively high priority is canceled. In addition, the information processing device 100 may achieve a reduction in an amount of usage of a storage area as compared with a case where the received conditions are stored in time series order.

The information processing device 100 may set a reservation by the user for the one resource when receiving a reservation request as a result of outputting the notification that the reservation for the one resource can be set to the user. Thus, the information processing device 100 may set a reservation by the user for the resource desired to be used by the user with a high priority, and may therefore facilitate a reservation for the resource desired to be used by the user with a high priority.

The information processing device 100 may store the transition information and the set reservation by the user in the storage unit in association with the user. When the reservation request is received, the information processing device 100 may set the reservation by the user for the one resource, and cancel a reservation by the user, the reservation being stored in the storage unit in association with the user. Thus, when a new reservation by the user is set for the resource whose reservation is canceled, the information processing device 100 may cancel a previously set reservation by the user, and therefore facilitate utilization of resources.

When each of one or more resources retrieved under the received condition is already reserved, the information processing device 100 may receive again a condition for searching for a resource, the condition being specified from the user. Thus, the information processing device 100 may repeat reception of a condition for searching for a resource.

When none of the plurality of resources is retrieved under the received condition, the information processing device 100 may receive again a condition for searching for a resource, the condition being specified from the user. Thus, the information processing device 100 may repeat reception of a condition for searching for a resource.

When a re-retrieval request is received from the user, the information processing device 100 may receive a condition for searching for a resource, the condition being specified from the user. Thus, the information processing device 100 may repeat reception of a condition for searching for a resource.

The information processing device 100 may be applied to a case where the resource is a conference room, and the condition includes an item condition related to an item indicating a time for which to use the conference room, an item indicating a facility of the conference room, or an item indicating a place where the conference room is located. Thus, the information processing device 100 may manage a conference reservation for the conference room.

The information processing device 100 may display a screen controlling input and output of information in a format of interaction with the user on the terminal device 201 of the user. The information processing device 100 may receive the condition for searching for a resource, the condition being specified from the user, from the terminal device 201 via the screen. The information processing device 100 may search for one or more resources matching the received condition among the plurality of resources, transmit a search result to the terminal device 201, and make the search result displayed via the screen. The information processing device 100 may receive a setting request to set a reservation by the user for a retrieved resource from the terminal device 201 via the screen. When the information processing device 100 receives the setting request, the information processing device 100 may set the reservation by the user for the retrieved resource. Thus, the information processing device 100 may implement a chat bot, and may manage the reservation for the resource via the chat bot.

The information processing device 100 may transmit a notification that a reservation for one resource can be set to the terminal device 201. Thus, the information processing device 100 may make the user of the terminal device 201 grasp the notification.

When a reservation for one resource of the plurality of resources by another user is canceled, the information processing device 100 may output a notification that a reservation for the one resource can be set to the user. Thus, the information processing device 100 may not output a notification about a resource whose reservation is canceled by a user to the same user.

The information processing device 100 may store a resource for which the user does not set a reservation in the storage unit in association with the user based on a condition when the resource for which the user can set a reservation is retrieved but the user does not set a reservation. The information processing device 100 may not output a notification that a reservation for one resource can be set to the user when the resource whose reservation is canceled matches the resource stored in the storage unit in association with the user. Thus, the information processing device 100 may not output the notification that a new reservation for the resource can be set to the user determined not to intend to use the resource whose reservation is canceled. Therefore, the information processing device 100 may preclude the user from receiving a notification of the resource that the user does not intend to use, and may consequently suppress an increase in a work load on the user.

The information processing device 100 may calculate an index value based on which condition in specification order is a condition identified from information stored in the storage unit in association with each user and matching one resource. Thus, the information processing device 100 may narrow down users as output targets in consideration of a priority with which the user desires to use a resource whose reservation is canceled, that is, in consideration of an intention of the user, based on the index value.

The information processing device 100 may calculate an index value indicating the degree of compromise of a condition matching one resource based on a number of times that the condition for searching for a resource is changed. Thus, the information processing device 100 may easily set, as an output target, a user who changes the condition for searching for a resource a large number of times and is unable to set a reservation for a resource desired to be used with a relatively high priority, and is therefore determined to suffer a great disadvantage. Therefore, the information processing device 100 may achieve an improvement in the convenience of the user.

When a reservation by the user for a resource retrieved under a first condition received via the screen is set, the information processing device 100 may generate transition information based on conditions received before the first condition among conditions received during the display of the screen. Thus, the information processing device 100 may set the conditions received before the first condition during the display of the screen as conditions used to generate the transition information, and may therefore generate the transition information easily in one unit of reservation work.

When reception of a condition for searching for a resource is stopped, the information processing device 100 may store the transition information in the storage unit in association with the user based on conditions received before the stopping of the reception among the conditions received during the display of the screen. Thus, the information processing device 100 may set the conditions received before the stopping of the reception during the display of the screen as conditions used to generate the transition information, and may therefore generate the transition information easily in one unit of reservation work.

The information processing device 100 may receive a condition for searching for a resource, the condition being specified from the user, by using the input device 306. The information processing device 100 may search for one or more resources matching the received condition among the plurality of resources, and output a search result by using the output device 307. The information processing device 100 may receive a setting request to set a reservation by the user for a retrieved resource by using the input device 306. When the information processing device 100 receives the setting request, the information processing device 100 may set a reservation by the user for the retrieved resource. Thus, the information processing device 100 may set a reservation by the user of the own device.

Incidentally, the reservation managing method described in the present embodiment can be implemented by executing a program prepared in advance by a computer such as a personal computer, a workstation, or the like. The reservation managing program described in the present embodiment is recorded on a computer readable recording medium such as a hard disk, a flexible disk, a CD-ROM, an MO, a DVD, or the like, and is executed by being read from the recording medium by the computer. In addition, the reservation managing program described in the present embodiment may be distributed via a network such as the Internet or the like.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A reservation managing method implemented by a computer, the reservation managing method comprising:
   executing first processing in response to receiving of a condition for searching for a resource, the received condition being a condition specified from a user, the first processing including searching for a resource matching the received condition among a plurality of resources;
   storing information about transition of the condition for searching for a resource in a memory in association with the user based on a condition when a reservation by the user is not set among the received conditions; and
   outputting a notification that a reservation for one resource of the plurality of resources is settable to the user when a reservation for the one resource is canceled, and when the one resource matches the condition identified from the information stored in the memory in association with the user,
   wherein the memory is configured to store the information about the transition of the condition for searching for a resource in association with each of a plurality of users,
   when a reservation for one resource of the plurality of resources is canceled, the computer identifies one or more users associated with information stored in the memory, the information being able to identify a condition matching the one resource, among the plurality of users,
   the outputting of the notification is configured to output a notification that a reservation for the one resource may be set to one of the identified one or more users,
   the computer performs calculating an index value indicating a degree of compromise of the condition matching the one resource, the condition being identified from the information stored in the memory in association with each user of the identified one or more users, and
   the outputting of the notification is configured to output the notification that the reservation for the one resource may be set to one of the identified one or more users based on the calculated index value.

2. The reservation managing method according to claim 1, wherein
when a reservation by the user for a resource retrieved under a first condition is set, the storing of the information is configured to store the information about the transition of the condition for searching for a resource in the memory in association with the user based on a condition received before the first condition among the received conditions.

3. The reservation managing method according to claim 2, wherein
when the reservation by the user for the resource retrieved under the first condition is set, the storing of the information is configured to store the information about the transition of the condition for searching for a resource in the memory in association with the user based on the first condition and a condition received before the first condition among the received conditions.

4. The reservation managing method according to claim 1, wherein
when reception of the condition for searching for a resource is stopped, the information about the transition of the condition for searching for a resource is stored in the memory in association with the user based on a condition received before the stopping of the reception among the received conditions.

5. The reservation managing method according to claim 1, wherein
the condition includes an item condition related to at least one of a plurality of items,
the storing of the information is configured to store information about transition of an item condition for each item and order in which the plurality of items are arranged in ascending order of timing in which the item conditions are changed for a first time in the memory in association with the user based on a difference between two consecutive conditions under which the user does not set a reservation among the received conditions, and
the calculating of the index value is configured to calculate the index value based on how early timing is in which timing an item condition is changed for a first time in an item related to the condition matching the one resource, the condition being identified from the information stored in the memory in association with the each user, and which item condition in transition order in the item is included in the condition matching the one resource.

6. The reservation managing method according to claim 1, wherein
the computer performs setting the reservation by the user for the one resource when receiving a reservation request as a result of outputting the notification that the reservation for the one resource may be set to the user.

7. The reservation managing method according to claim 6, wherein
when the user sets a reservation for a resource retrieved under a first condition, the storing of the information is configured to store the information about the transition of the condition for searching for a resource and the set reservation by the user in the memory in association with the user based on a condition received before the first condition among the received conditions, and
when the reservation request is received, the setting sets the reservation by the user for the one resource and cancels a reservation by the user, the reservation being stored in the memory in association with the user.

8. The reservation managing method according to claim 1, wherein
when each of one or more resources retrieved under the received condition is already reserved, the searching is configured to receive again the condition for searching for a resource, the condition being specified from the user.

9. The reservation managing method according to claim 1, wherein
when none of the plurality of resources is retrieved under the received condition, the searching is configured to receive again the condition for searching for a resource, the condition being specified from the user.

10. The reservation managing method according to claim 1, wherein
when a re-retrieval request is received from the user, the searching receives the condition for searching for a resource, the condition being specified from the user.

11. The reservation managing method according to claim 1, wherein
the resource is a conference room, and
the condition includes an item condition related to an item indicating a time for which to use the conference room, an item indicating a facility of the conference room, or an item indicating a place where the conference room is located.

12. The reservation managing method according to claim 1, wherein
the computer performs displaying a screen controlling input and output of information in a format of interaction with the user on a terminal device of the user, and
the searching
receives the condition for searching for a resource, the condition being specified from the user, from the terminal device via the screen,
searches for one or more resources matching the received condition among the plurality of resources,
transmits a search result to the terminal device, and makes the search result display via the screen,
receives a setting request to set a reservation by the user for a retrieved resource from the terminal device via the screen, and
sets the reservation by the user for the retrieved resource when receiving the setting request.

13. A non-transitory computer-readable storage medium for storing a reservation managing program which causes a processor to perform processing for object recognition, the processing comprising:
executing first processing in response to receiving of a condition for searching for a resource, the received condition being a condition specified from a user, the first processing including searching for a resource matching the received condition among a plurality of resources;
storing information about transition of the condition for searching for a resource in a memory in association with the user based on a condition when a reservation by the user is not set among the received conditions; and
outputting a notification that a reservation for one resource of the plurality of resources is settable to the user when a reservation for the one resource is canceled, and when the one resource matches the condition identified from the information stored in the memory in association with the user, wherein the memory is configured to store the information about the transition of the condition for searching for a resource in association with each of a plurality of users, when a reservation for one resource of the plurality of resources is canceled, the computer identifies one or more users associated with information stored in the memory, the information being able to identify a condition matching the one resource, among the plurality of users, the outputting of the notification is configured to output a notification that a reservation for the one resource may be set to one of the identified one or more users, the computer performs calculating an index value indicating a degree of compromise of the condition matching the one resource, the condition being identified from the information stored in the memory in association with each user of the identified one or more users, and the outputting of the notification is configured to output the notification that the reservation for the one resource may be set to one of the identified one or more users based on the calculated index value.

14. An information processing device comprising:
a memory; and
a processor coupled to the memory, the processor being configured to
execute first processing in response to receiving of a condition for searching for a resource, the received condition being a condition specified from a user, the first processing including searching for a resource matching the received condition among a plurality of resources,
store information about transition of the condition for searching for a resource in a memory in association with the user based on a condition when a reservation by the user is not set among the received conditions, and output a notification that a reservation for one resource of the plurality of resources may be set to the user when a reservation for the one resource is canceled, and when the one resource matches the condition identified from the information stored in the memory in association with the user, wherein the memory is configured to store the information about the transition of the condition for searching for a resource in association with each of a plurality of users, when a reservation for one resource of the plurality of resources is canceled, the computer identifies one or more users associated with information stored in the memory, the information being able to identify a condition matching the one resource, among the plurality of users, the outputting of the notification is configured to output a notification that a reservation for the one resource may be set to one of the identified one or more users, the computer performs calculating an index value indicating a degree of compromise of the condition matching the one resource, the condition being identified from the information stored in the memory in association with each user of the identified one or more users, and the outputting of the notification is configured to output the notification that the reservation for the one resource may be set to one of the identified one or more users based on the calculated index value.

* * * * *